United States Patent
Zitnick, III et al.

(10) Patent No.: US 7,324,687 B2
(45) Date of Patent: Jan. 29, 2008

(54) COLOR SEGMENTATION-BASED STEREO 3D RECONSTRUCTION SYSTEM AND PROCESS

(75) Inventors: Charles Zitnick, III, Seattle, WA (US); Sing Bing Kang, Redmond, WA (US); Matthew Uyttendaele, Seattle, WA (US); Simon Winder, Seattle, WA (US); Richard Szeliski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 10/879,327

(22) Filed: Jun. 28, 2004

(65) Prior Publication Data

US 2005/0286757 A1   Dec. 29, 2005

(51) Int. Cl.
*G06K 9/00* (2006.01)
(52) U.S. Cl. .......... 382/154; 382/164
(58) Field of Classification Search ........ 382/106, 382/154, 164, 171, 173, 302; 348/42, 43; 345/427, 592
See application file for complete search history.

(56) References Cited

U.S. PATENT DOCUMENTS

| | | | |
|---|---|---|---|
| 5,179,441 A * | 1/1993 | Anderson et al. | 348/43 |
| 6,788,809 B1 * | 9/2004 | Grzeszczuk et al. | 382/154 |
| 2004/0109585 A1 | 6/2004 | Tao et al. | |

FOREIGN PATENT DOCUMENTS

WO    WO-0207839 A2    1/2002

OTHER PUBLICATIONS

Imori, T., T. Kimoto, B. Touji, T. Fujii, M. Tanimoto, A segmentation-based multiple-baseline stereo (SMBS) scheme for scquisition of depth in 3-D scenes IEICE Trans. on Information and Systems, Feb. 1, 1998, vol. E81-D, No. 2, pp. 215-223.
Tao, H., H. S. Sawhney, R. Kumar, A global matching framework for stereo computation, International Conf. on Computer Vision, ICCV01, 2001, pp. 532-539.
Scharstein, D., and R. Szeliski, Stereo matching with nonlinear diffusion, Int'l J. of Computer Vision, 1998, pp. 155-174, vol. 28, No. 2.
Yang, Y, A. Yuille, and J. Lu, Local, global, and multilevel stereo matching, Proceedings of the IEEE Conf. on Computer Vision and Pattern Recognition, 1993, pp. 274-279.

(Continued)

*Primary Examiner*—Duy M. Dang
(74) *Attorney, Agent, or Firm*—Lyon & Harr, LLP; Richard T. Lyon

(57) ABSTRACT

A system and process for computing a 3D reconstruction of a scene from multiple images thereof, which is based on a color segmentation-based approach, is presented. First, each image is independently segmented. Second, an initial disparity space distribution (DSD) is computed for each segment, using the assumption that all pixels within a segment have the same disparity. Next, each segment's DSD is refined using neighboring segments and its projection into other images. The assumption that each segment has a single disparity is then relaxed during a disparity smoothing stage. The result is a disparity map for each image, which in turn can be used to compute a per pixel depth map if the reconstruction application calls for it.

34 Claims, 14 Drawing Sheets

OTHER PUBLICATIONS

European Search Report, Application No. EP0510533104, completed Mar. 30, 2007, received Apr. 11, 2007.

Buehler, C., M. Bosse, L. McMillan, S. Gortler, and M. Cohen, Unstructured lumigraph rendering, *Proceedings of SIGGRAPH 2001*, pp. 425-432.

Carceroni, R. L., and K. Kutulakos, Multi-view scene capture by surfel sampling: From video streams to non-rigid 3D motion, shape and reflectance, *Eighth International Conference on Computer Vision*, vol. II, pp. 60-67.

Carranza, J., C. Theobalt, M. Magnor, and H.-P. Seidel, Free-viewpoint video of human actors, *ACM Transactions on Graphics*, vol. 22, No. 3, pp. 569-577.

Chang, C.-L., X. Zhu, P. Ramanathan, and B. Girod, Inter-view wavelet compression of light fields with disparity-compensated lifting, *SPIE Visual Communications and Image Processing 2003, Invited Paper*.

Chuang, Y.-Y., B. Curless, D. Salesin, and R. Szeliski, A Bayesian approach to digital matting, *Conf. on Comp. Vision and Pattern Recognition*, 2001, vol. II, pp. 264-271.

Debevec, P.E., C. J. Taylor, and J. Malik, Modeling and rendering architecture from photographs: A hybrid geometry- and image-based approach, *Computer Graphics (SIGGRAPH'96)*, Aug. 1996, pp. 11-20.

Debevec, P.E., Y. Yu, and G. Borshukov, Efficient view-dependent image-based rendering with projective texture mapping, *Ninth Eurographics Rendering Workshop*, Vienna, Austria, Jun. 1998.

Gortler, S.J., R. Grzeszczuk, R. Szeliski, and M. F. Cohen, The lumigraph, *ACM SIGGRAPH Comp. Graphics Proceedings, Annual Conference Series*, pp. 43-54.

Hall-Holt, O., and S. Rusinkiewicz, Stripe boundary codes for real-time structured-light range scanning of moving objects, *Eighth Int'l. Conf. on Comp. Vision*, vol. II, pp. 359-366.

Heigl, B., R. Koch, M. Pollefeys, J. Denzler, L. Van Gool, Plenoptic modeling and rendering from image sequences taken by hand-held camera, *DAGM'99*, pp. 94-101.

Kanade, T., P. W. Rander, and P. J. Narayanan, Virtualized reality: constructing virtual worlds from real scenes, *IEEE MultiMedia Magazine*, Jan.-Mar. 1997, vol. 1, No. 1, pp. 34-47.

Levoy, M. and P. Hanrahan, Light field rendering, *ACM SIGGRAPH Comp. Graphics Proceedings, Annual Conference Series*, Aug. 1996, pp. 31-42.

Pulli, K., M. Cohen, T. Duchamp, H. Hoppe, L. Shapiro, and W. Stuetzle, View-based rendering, *Eurographics Workshop on Rendering*, 1997, pp. 23-34.

Scharstein, D., and R. Szeliski, A taxonomy and evaluation of dense two-frame stereo correspondence algorithms, *Int'l. J. of Comp. Vision*, vol. 47, No. 1, pp. 7-42.

Seitz, S. M., and C. M. Dyer, Photorealistic scene reconstruction by voxel coloring, *CVPR'97*, Jun. 1997, pp. 1067-1073.

Shade, J., S. Gortler, L.-W. He, and R. Szeliski, Layered depth images, *Comp. Graphics (SIGGRAPH'98). Proceedings*, Jul. 1998, pp. 231-242.

Tao, H., H. Sawhney, and R. Kumar, A global matching framework for stereo computation, *Eighth Int'l. Conf. on Comp. Vision*, vol. I, pp. 532-539.

Vedula, S., S. Baker, S. Seitz, and T. Kanade, Shape and motion carving in 6D, *Conf. on Comp. Vision and Patten Recognition*, vol. II, pp. 592-598.

Wexler, Y., A. Fitzgibbon, and A. Zisserman, Bayesian estimation of layers from multiple images, *Seventh European Conf. on Comp. Vision*, vol. III, pp. 487-501.

U.S. Appl. No. 10/880,774, filed Jun. 28, 2004, Kang et al.

U.S. Appl. No. 10/879,235, filed Jun. 28, 2004, Zitnick et al.

U.S. Appl. No. 10/910,077, filed Aug. 3, 2004, Winder et al.

U.S. Appl. No. 10/910,088, filed Aug. 3, 2004, Uyttendaele et al.

Wilburn, B., M. Smulski, H. K. Lee and M. Horowitz, The light field video camera, *SPIE Electronic Imaging: Media Processors*, vol. 4674, pp. 29-36.

Yang, J. C., M. Everett, C. Buehler, and L. McMillan, A real-time distributed light field camera, *Thirteenth Eurographics Workshop on Rendering*, 2002, pp. 77-85.

Zhang, L., B. Curless, and S. M. Seitz, Spacetime stereo: Shape recovery for dynamic scenes, *Conf. on Comp. Vision and Pattern Recognition*, 2003, pp. 367-374.

Zhang, Y., and C. Kambhamettu, On 3D scene flow and structure estimation, *Conf. on Comp. Vision and Pattern Recognition*, 2001, vol. II, pp. 778-785.

Zhang, Z. A flexible new technique for camera calibration, *Technical Report: MSR-TR-98-71*, Microsoft Research, Redmond, WA.

Ziegler, G., H. Lensch, N. Ahmed, M. Magnor, and H.-P. Seidel, Multi-video compression in texture space, *IEEE International Conference on Image Processing (ICIP'04)*, 2004, (accepted for publication).

Ziegler, G., H. Lensch, M. Magnor, and H.-P. Seidel, Multi-video compression in texture space using 4D SPIHT, *IEEE Int'l. Workshop on Multimedia and Signal Processing, (MMSP'04)*, 2004, (accepted for publication).

Chai, B.-B., S. Sethuraman, H. S. Sawhney, P. Hatrack, Depth map compression for real-time view-based rendering, *Pattern Recognition Letters*, 2004, vol. 25, No. 7, pp. 755-766.

Grammalidis, N., M. G. Strintzis, Sprite generation and coding in multiview image sequences, *IEEE Transactions on Circuits and Sys. for Video Tech.*, Mar. 2000, vol. 10, No. 2, pp. 302-311.

Krishnamurthy, R., B.-B. Chai, H. Tao, S.Sethuraman, Compression and transmission of depth maps for image-based rendering, *Int'l Conf. on Image Processing*, 2001, vol. 3, pp. 828-831.

Lim, J., K. N. Ngan, W. Yang, K. Sohn, A multiview sequence CODEC with view scalability, *Signal Processing: Image Communication*, 2004, vol. 19, pp. 239-256.

Szeliski, R., Scene reconstruction from multiple cameras, *Int'l Conf. on Image Processing (ICIP-2000)*, Vancouver, Sep. 2000, vol. I, pp. 13-16.

Torr, P., R. Szeliski, and P. Anandan, An integrated Bayesian approach to layer extraction from image sequences, *IEEE Trans. on Pattern Analysis and Mach. Intelligence*, 2001, vol. 23, No. 3, pp. 297-303.

\* cited by examiner

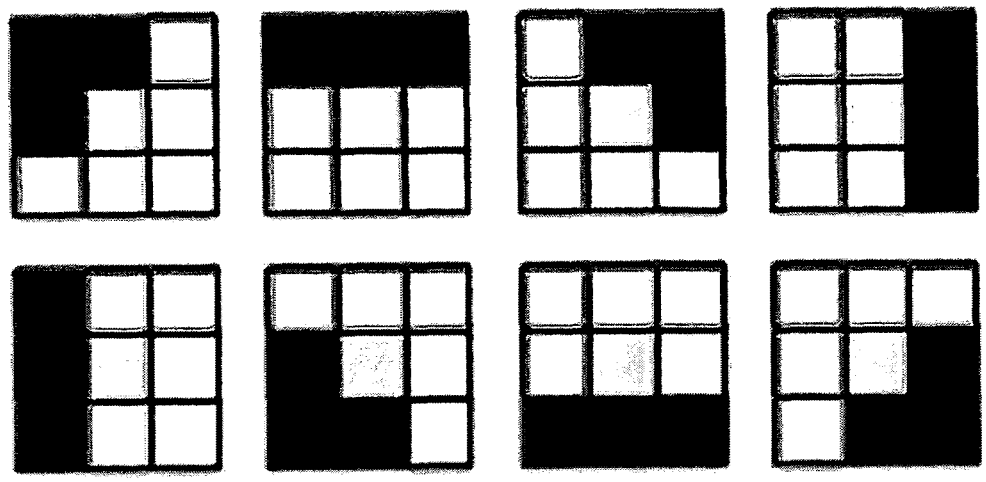
FIG. 4
 
FIG. 6(a)  FIG. 6(b)

Good match    Bad match

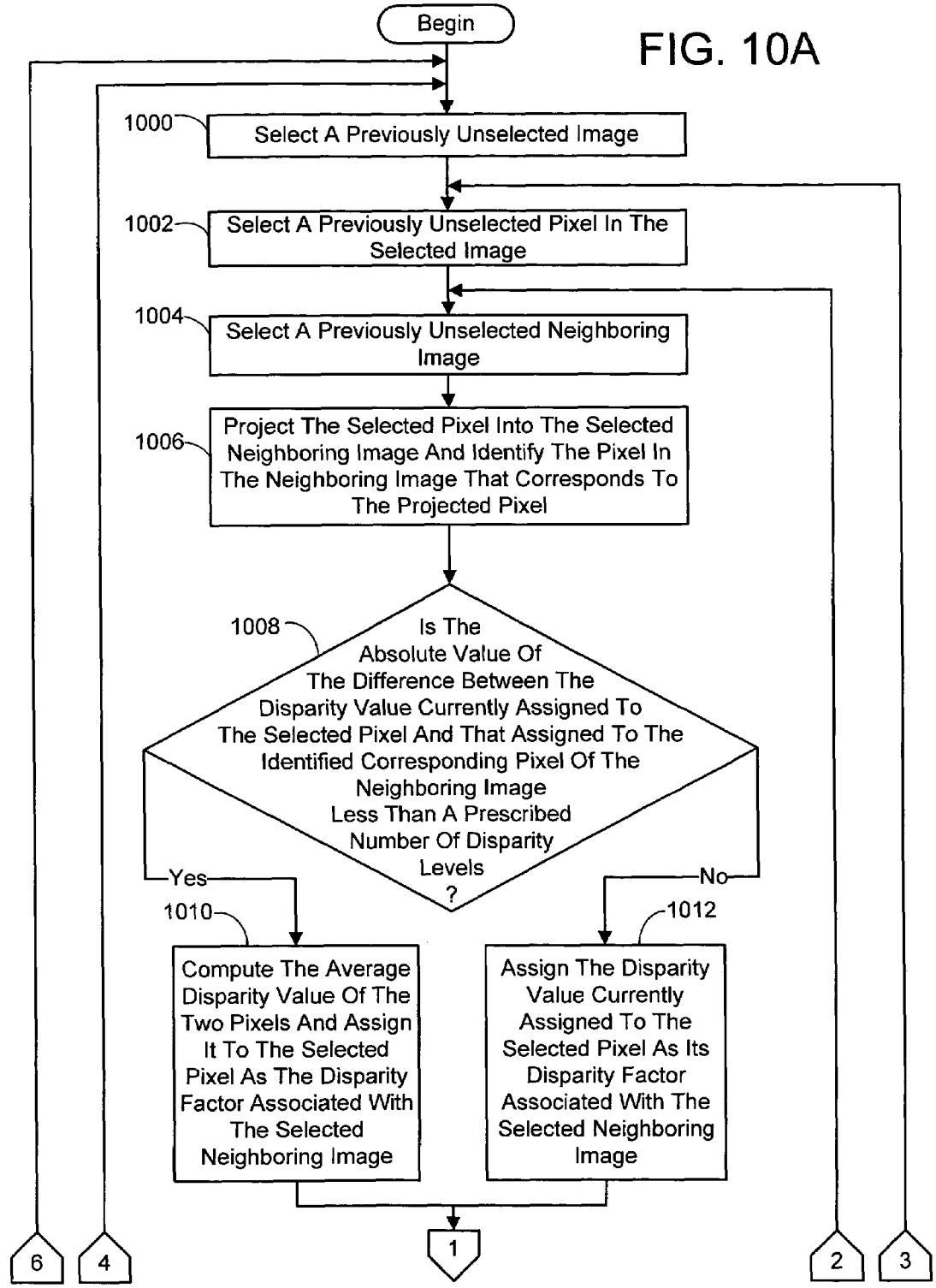

COLOR SEGMENTATION-BASED STEREO 3D RECONSTRUCTION SYSTEM AND PROCESS

BACKGROUND

1. Technical Field

The invention is related to 3D reconstruction of a scene using multiple images thereof, and more particularly to a system and process for computing such a 3D reconstruction using a color segmentation-based approach.

2. Background Art

Stereo reconstruction generally involves using multiple images taken from different viewpoints to reconstruct a 3D model of the scene depicted in the images. Typically, this reconstruction entails recovering depth maps (often for each image) and identifying corresponding pixels between the images. These reconstructions are used for a variety of purposes. For example, depth maps obtained from stereo have been combined with texture maps extracted from input images in order to create realistic 3-D scenes and environments for virtual reality and virtual studio applications. Similarly, these maps have been employed for motion-compensated prediction in video processing applications. Still further, the recovered depth maps and correspondences have been used for view interpolation purposes to generate a "virtual" view of a scene from an arbitrary viewpoint using images associated with other viewpoints.

Unfortunately, the quality and resolution of most of today's algorithms falls quite short of that demanded by these applications. For example, traditional stereo algorithms tend to produce erroneous results around disparity discontinuities. Unfortunately, such errors produce some of the most noticeable artifacts in interpolated scenes, since disparity discontinuities typically coincide with intensity edges. For this reason, the stereo algorithm for view interpolation must correctly match pixels around intensity edges, which include disparity discontinuities.

Recently, a new approach to stereo vision called segmentation-based stereo has been proposed. These methods segment the image into regions likely to have similar or smooth disparities prior to the stereo computation. A smoothness constraint is then enforced for each segment. Tao et al. [2] used a planar constraint, while Zhang and Kambhamettu [3] used the segments for local support. These methods have shown very promising results in accurately handling disparity discontinuities.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process for computing a 3D reconstruction of a scene from multiple overlapping images which were captured from different viewpoints. This 3D reconstruction system and process uses the aforementioned segmentation-based approach, but improves upon the prior work. Namely, disparities within segments must be smooth but need not be planar, each image is treated equally (i.e., there is no reference image), occlusions are modeled explicitly, and consistency between disparity maps is enforced.

More particularly, the system and process for computing a 3D reconstruction according to the present invention involves first partitioning each image into segments whose pixels are likely to exhibit similar disparities. A disparity space distribution (DSD) for each segment of each image is then computed. This DSD is a set of probability estimates representing the likelihood that the pixels making up a segment exhibit a particular disparity for each of a group of candidate disparity values. The disparity value corresponding to the maximum probability in the DSD of each segment of each image is assigned to each pixel of the segment. Next, for each image, the disparity value assigned to each pixel is smoothed based on the disparities of corresponding pixels in the other images that depict the same portion of the scene and then based on the disparity values of neighboring pixels within the same segment of the image. The result of the smoothing operation is a disparity map for each image in the group images used to generate the reconstruction (which in turn can be used to compute a per pixel depth map if the reconstruction application calls for it).

The aforementioned segmentation of an image is accomplished in one embodiment of the invention by first assigning each pixel of the image under consideration to its own segment. Then, for each pixel in turn in a prescribed order (e.g., raster order), a prescribed number of neighboring pixels (e.g., the 4-connected neighbors) are reassigned to the segment associated with the pixel under consideration if the average color of the segment and that of the pixel under consideration differs by less than a prescribed threshold. It is next determined, for each segment of the image, if the segment is less than a prescribed number of pixels in area (e.g., 100 pixels in area). When a segment is found to be less than the prescribed number of pixels in area, the pixels of the segment are reassigned to the neighboring segment that has the closest average color to that of the segment under consideration. This is followed by determining if each segment is more than a prescribed number of pixels wide (e.g., 40 pixels), and if so, splitting the segment horizontally into as many equal segments as necessary to ensure each of the new thinner segments is not more than the prescribed number of pixels in width. Similarly, once the width of the segments has been addressed, it is determined if each of the current segments is more than a prescribed number of pixels tall (e.g., 40 pixels), and if so, splitting the segment vertically into as many equal segments as necessary to ensure each of the new shorter segments is not more than the prescribed number of pixels in height.

It is noted that improved results can be achieved if prior to the foregoing segmentation of the images, the color differences between adjacent pixels of each image are smoothed. This entails in one embodiment of the invention employing the following smoothing technique for each pixel in raster order. Namely, each possible grouping of a prescribed number (e.g., 3) of contiguous pixels neighboring the pixel under consideration is selected in turn, and for each selected group of pixels, the intensity of the color of each pixel in the selected group is subtracted from the intensity of the color of the pixel under consideration. The squared values of the resulting differences are summed to produce a total difference for the selected group. The group of pixels exhibiting the smallest total difference is then identified and the color of each of the pixels in the identified group and that of the pixel under consideration are averaged. The resulting average color is then assigned to the pixel under consideration as its current color. It is noted that the foregoing color smoothing procedure can be repeated a prescribed number of times to improve the results of the segmentation even further.

The aforementioned DSD computation is accomplished in one embodiment of the invention by first computing an initial disparity space distribution (DSD) for each segment of each image, and then refining the initial estimates by simultaneously enforcing a smoothness constraint between neighboring segments within the same image and a consistency constraint between corresponding segments in the other images that depict the same portion of the scene. The result is a refined DSD.

Before the DSD can be computed, a set of depths, each corresponding to a unique disparity, must be computed. First, the optical center of the camera used to capture the image representing a middle viewpoint is chosen as the world origin. The z or depth axis is aligned with the camera's orientation. Then, the depth values are computed using the following method. The center pixel from the middle camera's image is projected onto a neighboring image at the minimum depth specified by the user. Next, a new depth is added to the set such that the projection of the same pixel lies exactly a distance of one pixel, or one disparity value, from the previous projection. New depths are added until the depth values exceed the maximum depth specified by the user. The number of disparity values in the resulting range of candidate disparity values is set equal to the number of depth values found in the foregoing method.

Once the depths have been computed, the initial DSD can be computed for each segment of each image as follows. First, a disparity is selected. Next, a neighboring image of the image under consideration is selected. Then, each pixel in the segment under consideration is projected, using the depth associated with the selected disparity, into the selected neighboring image to identify the corresponding pixel in the neighboring image. If there is a corresponding pixel found, the ratio of one or more prescribed gains associated with the projected pixel and the identified neighboring image pixel is computed. For example, this could involve just the grey level intensity gains in the case where a single ratio is employed, or the gains associated with each color channel where multiple gains are employed. Once all the pixels of the segment have been considered, a pixel gain ratio histogram is generated. This histogram is used to compute the sum of its three largest contiguous bins. The sum is designated as a matching score for the segment under consideration with the selected neighbor image at the disparity associated with the projection of the segment.

The foregoing procedure is repeated for each remaining neighboring image and then repeated at each remaining disparity in the aforementioned range of candidate disparity values for the each neighboring image to produce matching scores for each candidate disparity value for each neighboring image. At this point, for each candidate disparity value, the product of the matching scores computed in connection with all the neighboring images for the candidate disparity under consideration is divided by the sum of the product of the matching scores computed in connection with all the neighboring images for every candidate disparity value, to produce an initial DSD probability for that disparity value.

The aforementioned refining of the initial DSD probabilities can be computed for each segment of each image using the equation $$p_{ij}(d) = \frac{l_{ij}(d) \prod_{k \in N_i} c_{ijk}(d)}{\sum_{d'} l_{ij}(d') \prod_{k \in N_i} c_{ijk}(d')},$$

where $p_{ij}(d)$ refers to a refined disparity probability value associated with probability d for segment $s_{ij}$, $l_{ij}(d)$ is a function that enforces the smoothness constraint, $c_{ijk}(d)$ is a function that enforces the consistency constraint with each neighboring image in the group of neighboring images $N_i$, and d' refers to all the disparity values having associated probability values. This is an iterative approach in that the refining across the images is repeated a prescribed number of times (e.g., 50-60 times).

As described previously, the DSD probabilities are used to establish a disparity value for each pixel of each segment of each image. In doing this, an assumption was made that all the pixels in a segment will have the same disparity value. However, more accurate results can be achieved by relaxing this requirement and allowing the per pixel disparity values to vary within a segment. The disparity variation is based on the disparities of corresponding pixels in the other images that depict the same portion of the scene and on the disparity values of neighboring pixels within the same segment of the image. This disparity value smoothing process involves in one embodiment of the present invention, for each neighboring image of the image under consideration, first projecting the pixel under consideration into the neighboring image and identifying the pixel in the neighboring image that corresponds to the projected pixel, and then averaging the disparity values of the projected and corresponding pixels. This average is assigned to the pixel under consideration as the disparity factor associated with the neighboring image involved, whenever the absolute value of the difference between the disparity value currently assigned to the pixel under consideration and that assigned to the corresponding pixel in the neighboring image is less than a prescribed number of disparity levels (e.g., 4 levels). Otherwise, the disparity value of the pixel under consideration is assigned as the disparity factor associated with the neighboring image involved. The disparity factors assigned to the pixel under consideration in connection with each of neighboring images are summed and then divided by the number of neighboring images involved. The result of this computation is then assigned to the pixel under consideration as its current disparity value.

Once the inter-image smoothing is complete, an intra-image smoothing procedure can be performed. This entails, for each pixel of each segment of each image, averaging the currently-assigned disparity values of the pixels in a prescribed-sized window (e.g., 5x5 window) centered on the pixel under consideration, which are not outside the segment under consideration. The resulting average disparity value is then assigned to the pixel under consideration as its final disparity value.

The foregoing smoothing procedures are then repeated a prescribed number of times. For example, in tested embodiments the smoothing procedures were repeated between 10 to 20 times.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 4 is a diagram showing the neighboring 3-pixel groups used in the pixel color smoothing process of FIG. 3.

FIGS. 6(a) and (b) are exemplary images demonstrating the results of the segmentation process of FIGS. 5A-C, where FIG. 6(a) is an original image and FIG. 6(b) represents its segmentation.

FIGS. 10A-C are a flow chart diagramming a process for smoothing the disparity estimates for the pixels of each image that implements that part of the 3D reconstruction process of FIG. 2.

FIG. 11(a) is an image of a group of people watching a break dancer, FIG. 11(b) illustrates the results of the segmentation phase of the reconstruction, FIG. 11(c) exemplifies per pixel depths derived from the disparity estimates that would be obtained by assigning the disparity associated with the maximum probability value of the initial DSD of a segment to the pixels in that segment, FIG. 11(d) represents the per pixel depth obtained as in FIG. 11(c) but after the DSD probabilities are refined, and FIG. 11(e) represents the per pixel depths obtained after the disparity estimate smoothing procedure is performed.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
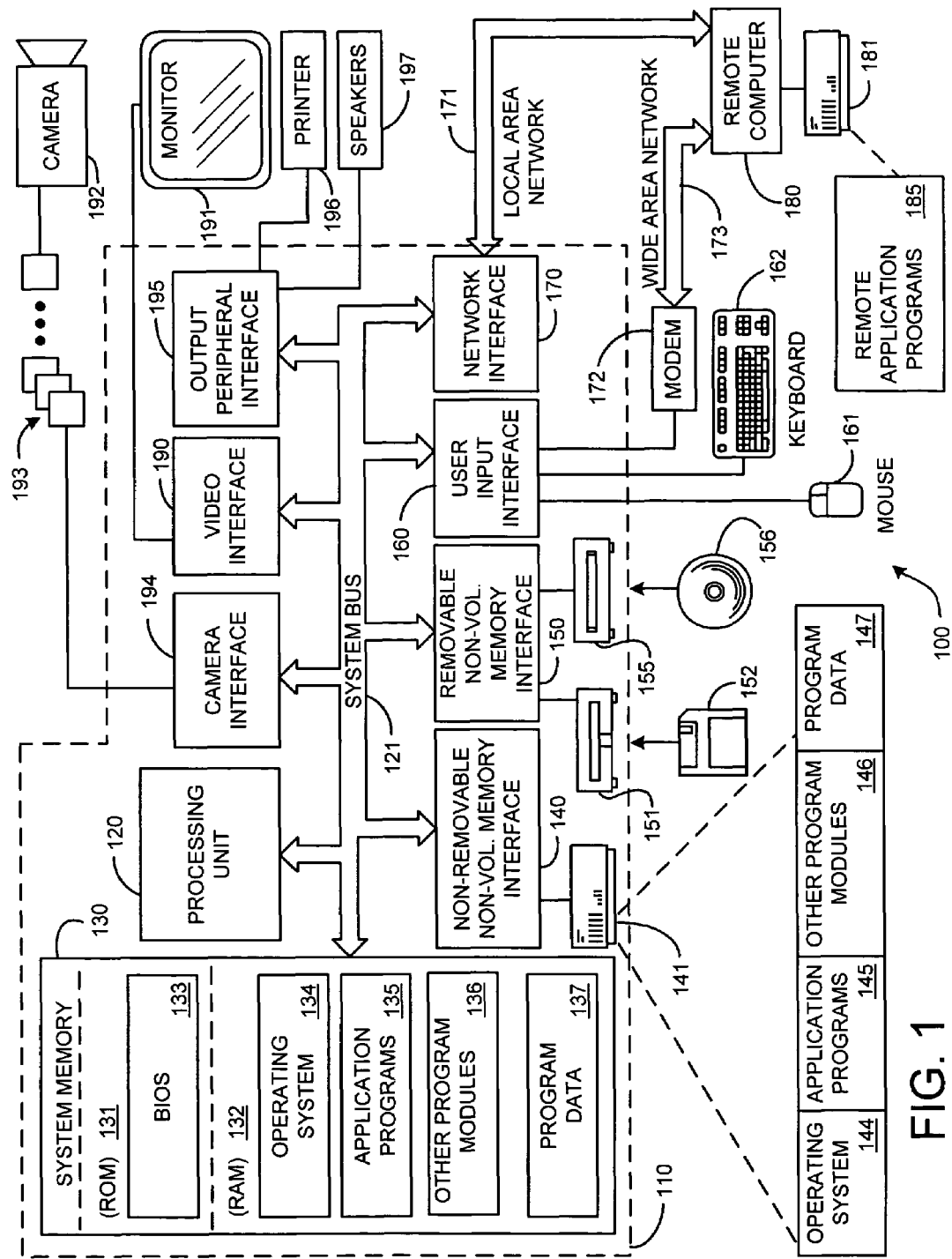
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Segmentation-Based 3D Reconstruction System and Process

The exemplary operating environment having now been discussed, the remaining part of this description section will be devoted to a description of the program modules embodying the invention. Generally, the system and process according to the present invention involves computing a 3D reconstruction of a scene from multiple images thereof. The images are captured from different viewpoints with each depicting a region of the scene that overlaps at least one other of the images by a prescribed amount (e.g., 60-100%). The multiple images can be of a dynamic scene if they are all simultaneously captured. To this end, multiple cameras placed at different viewpoint can be employed. In addition, it is noted that the multiple images could take the form of a group of contemporaneously captured frames generated by a series of video cameras placed at different viewpoints. These images can also be of a static scene, in which case a series of cameras placed at different viewpoints can be used as before, or a single camera can be moved from viewpoint to viewpoint to capture the multiple images since the scene is not changing.

Figure 2:
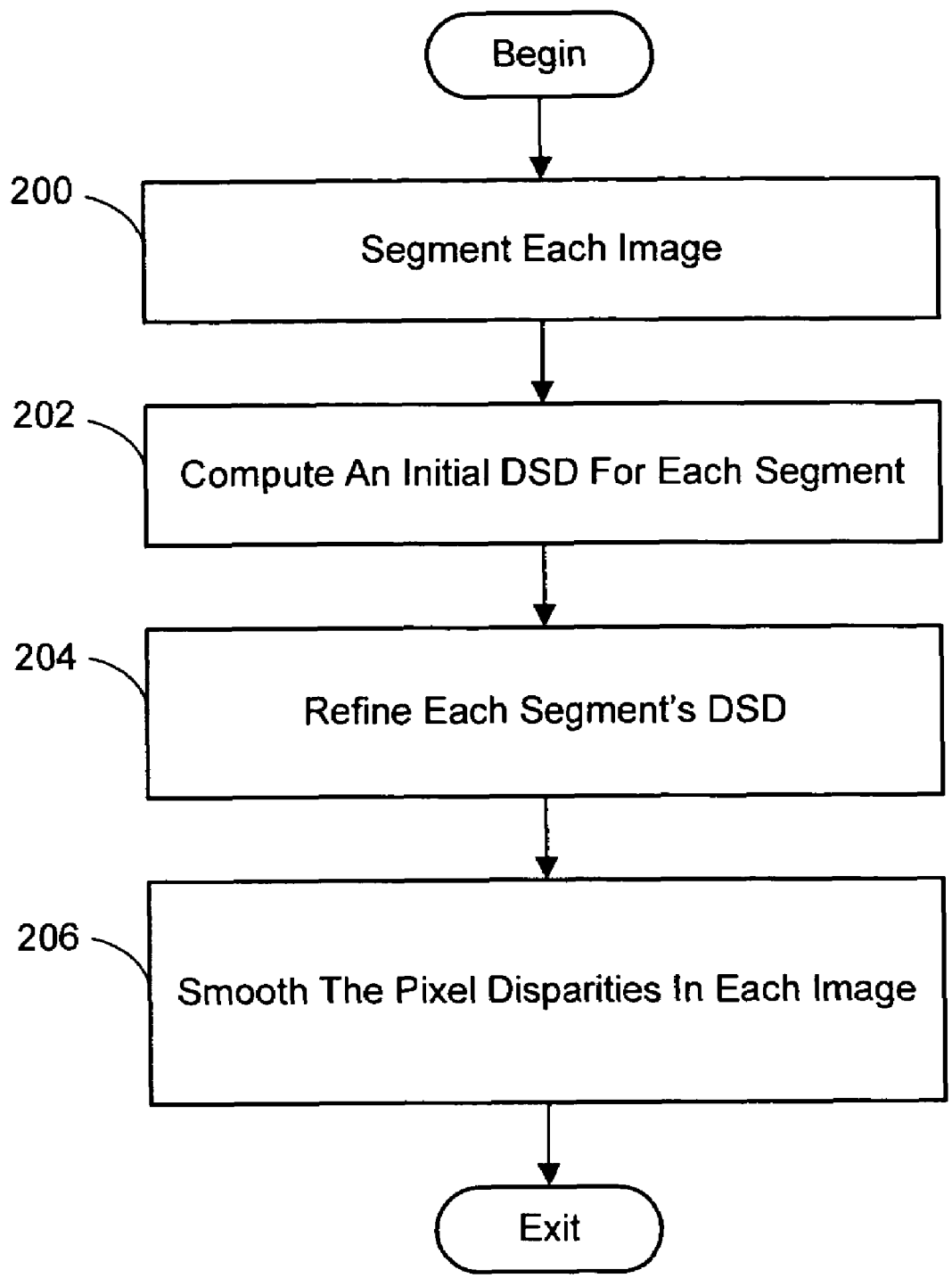
FIG. 2 is a flow chart diagramming an overall process for computing a 3D reconstruction of a scene using multiple images thereof and a color segmentation-based approach.

In general, the present 3D reconstruction technique is accomplished as follows, referring to the flow diagram of FIG. 2. First, each image is independently segmented (process action 200). Second, an initial disparity space distribution (DSD) is computed for each segment, using the assumption that all pixels within a segment have the same disparity (process action 202). Next, each segment's DSD is refined using neighboring segments and its projection into other images (process action 204). The assumption that each segment has a single disparity is then relaxed during a pixel disparity smoothing stage to produce a disparity map for each image (process action 206).

Each of the foregoing process actions will now be described in greater detail in the sections to follow.

2.1 Segmentation

The goal of segmentation is to split each image into regions that are likely to contain similar disparities. These regions or segments should be as large as possible to increase local support while minimizing the chance of the segments covering areas of varying disparity. In creating these segments, it is assumed that areas of homogeneous color generally have smooth disparities, i.e., disparity discontinuities generally coincide with intensity edges.

The present segmentation procedure has two phases. First, each of the multiple images is smoothed using a variant of anisotropic diffusion. Then, each image is segmented based on neighboring color values.

The purpose of smoothing prior to segmentation is to remove as much image noise as possible in order to create more consistent segments. It is also desired to reduce the number of thin segments along intensity edges. In general, the present smoothing procedure iteratively averages a pixel with three contiguous neighbors. The set of pixels used for averaging is determined by which pixels have the minimum squared difference in color from the center pixel. This simplified variant of the well known anisotropic diffusion and bilateral filtering algorithms produces good results for the present application.

Figure 3:
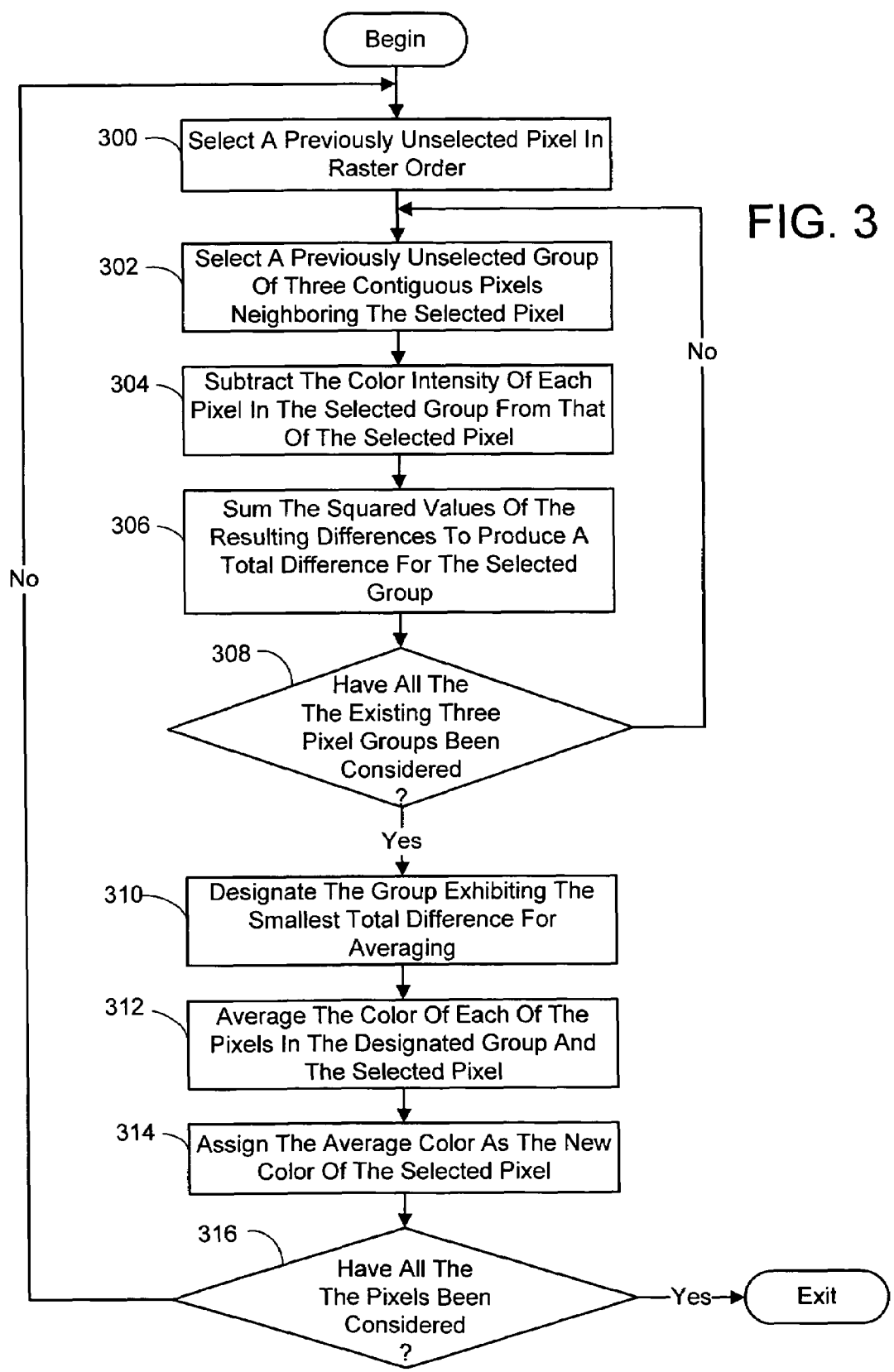
FIG. 3 is a flow chart diagramming a process for smoothing the pixel color of an image that represents an initial phase of the segmentation portion of the 3D reconstruction process of FIG. 2.

More particularly, referring to the flow diagram of FIG. 3, for the image under consideration, each pixel is selected in raster order (process action 300). Once a pixel has been selected, each group of three neighboring pixels (as shown in FIG. 4 as dark pixels) is selected in turn (process action 302). It is irrelevant what order each group is selected and if the selected pixel is a corner or edge pixel, only those neighboring pixel groups that actually exist are considered. For the selected group of three pixels, each color channel is subtracted from the corresponding values of the selected pixel (process action 304). The squared values of the resulting differences are then summed to produce a total difference for the selected group (process action 306). It is then determined if all the existing three pixel groups have been considered (process action 308). If not, process actions 302 through 308 are repeated. If all the pixel groups have been considered, then in process action 310, the group exhibiting the smallest squared difference sum is designated for averaging. Next, the color of each of the pixels in the designated group and the selected pixel are averaged (process action 312) and this result is assigned as the new color of the selected pixel (process action 314). It is then determined if all the pixels in the image have been selected (process action 316). If not, process actions 300 through 316 are repeated. If all the pixels have been considered, then the current iteration of the smoothing procedure ends.

The foregoing smoothing procedure is repeated a prescribed number of times. While any number of iterations can be performed, in tested embodiments of the present segmentation process it was found that 8 iterations of the smoothing procedure produced acceptable results.

It is noted that while groups of three neighbors (i.e., 3×3 windows) were used in the tested embodiments of the foregoing smoothing procedure, bigger windows could also be employed with success. For example, groups of five neighboring pixels (i.e., 5×5 windows) could be employed.

Figure 5A:
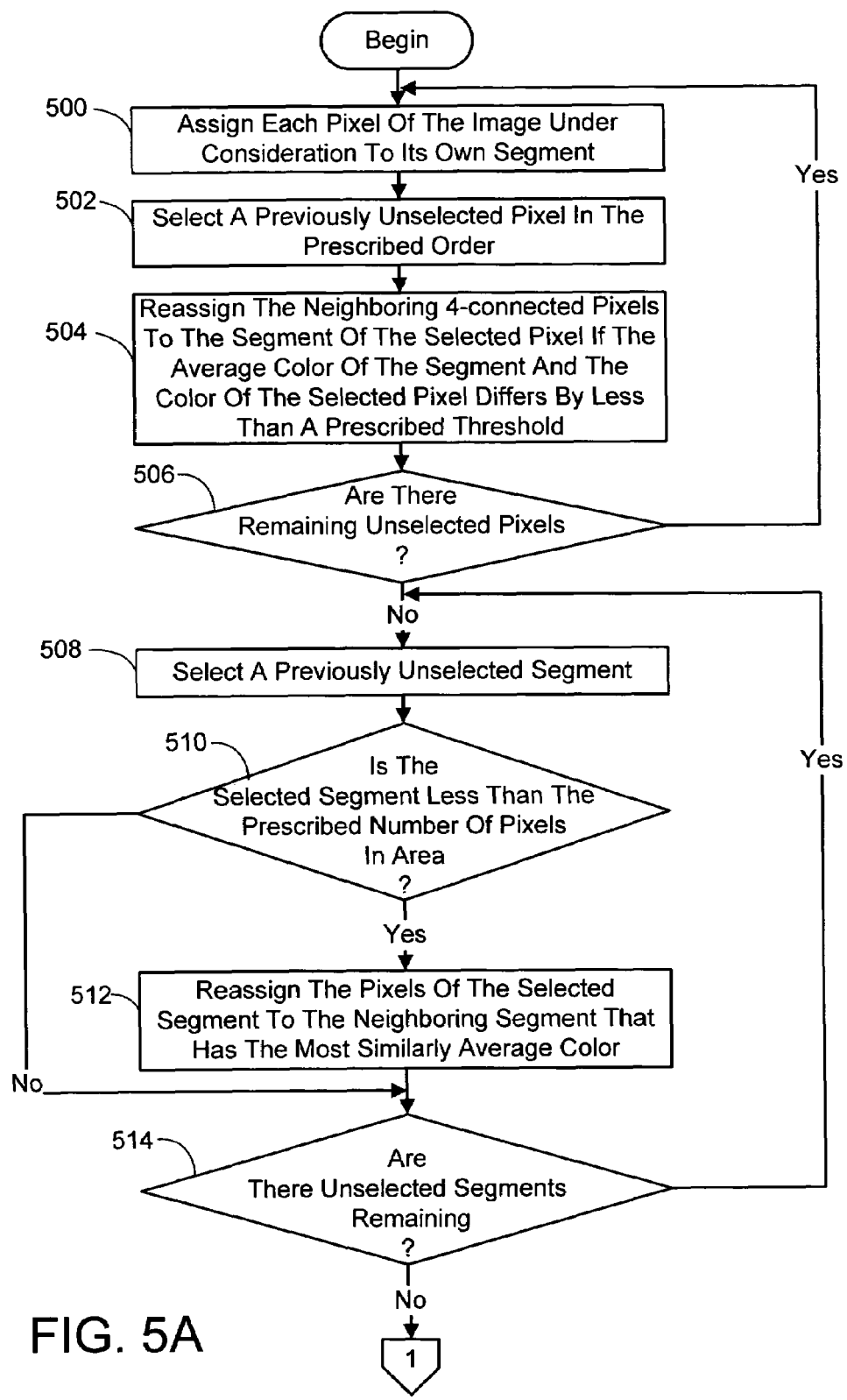
FIGS. 5A-C are a flow chart diagramming a process for segmenting the images that implements that part of the 3D reconstruction process of FIG. 2.
Figure 5B:
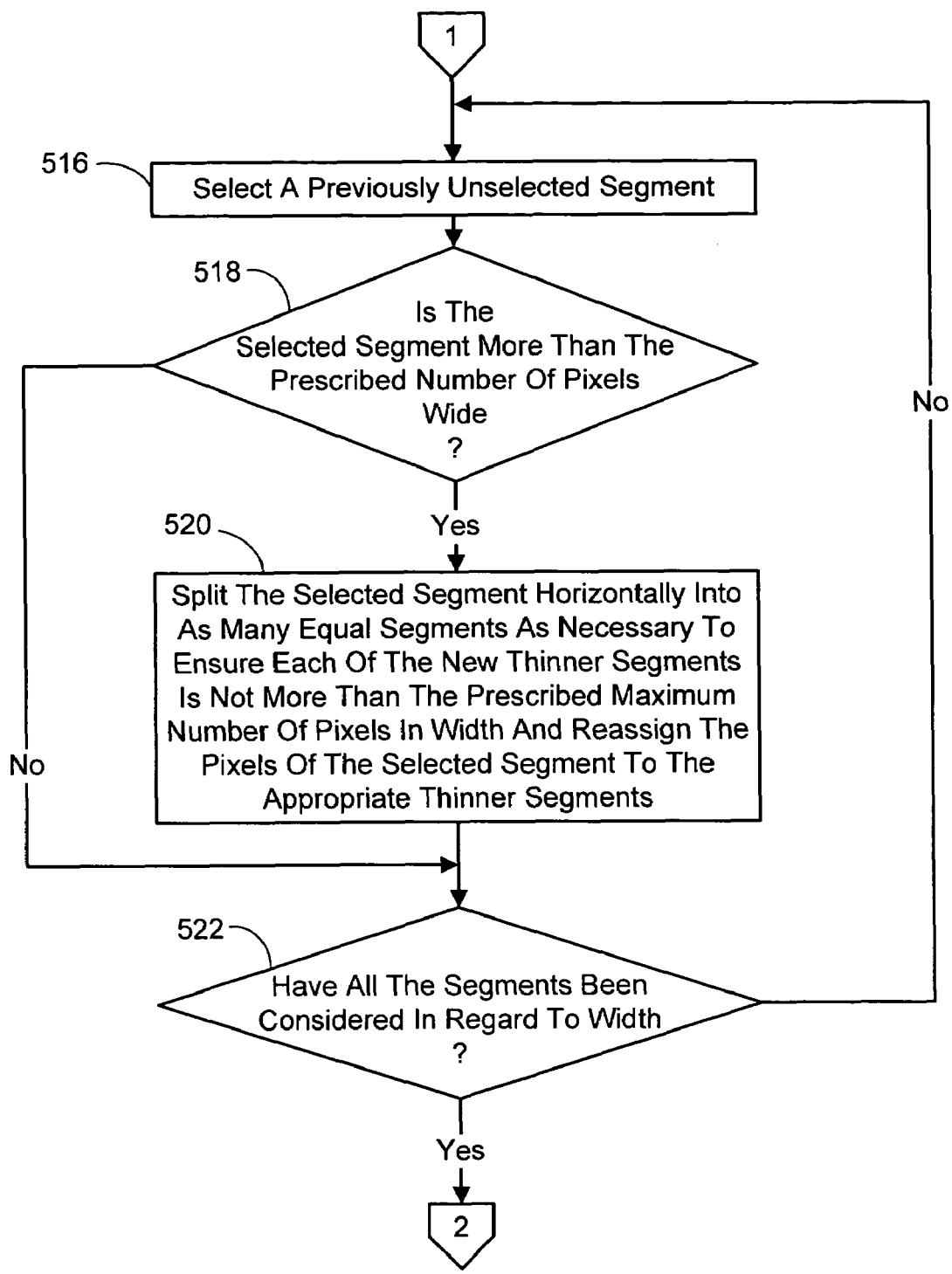
Figure 5C:
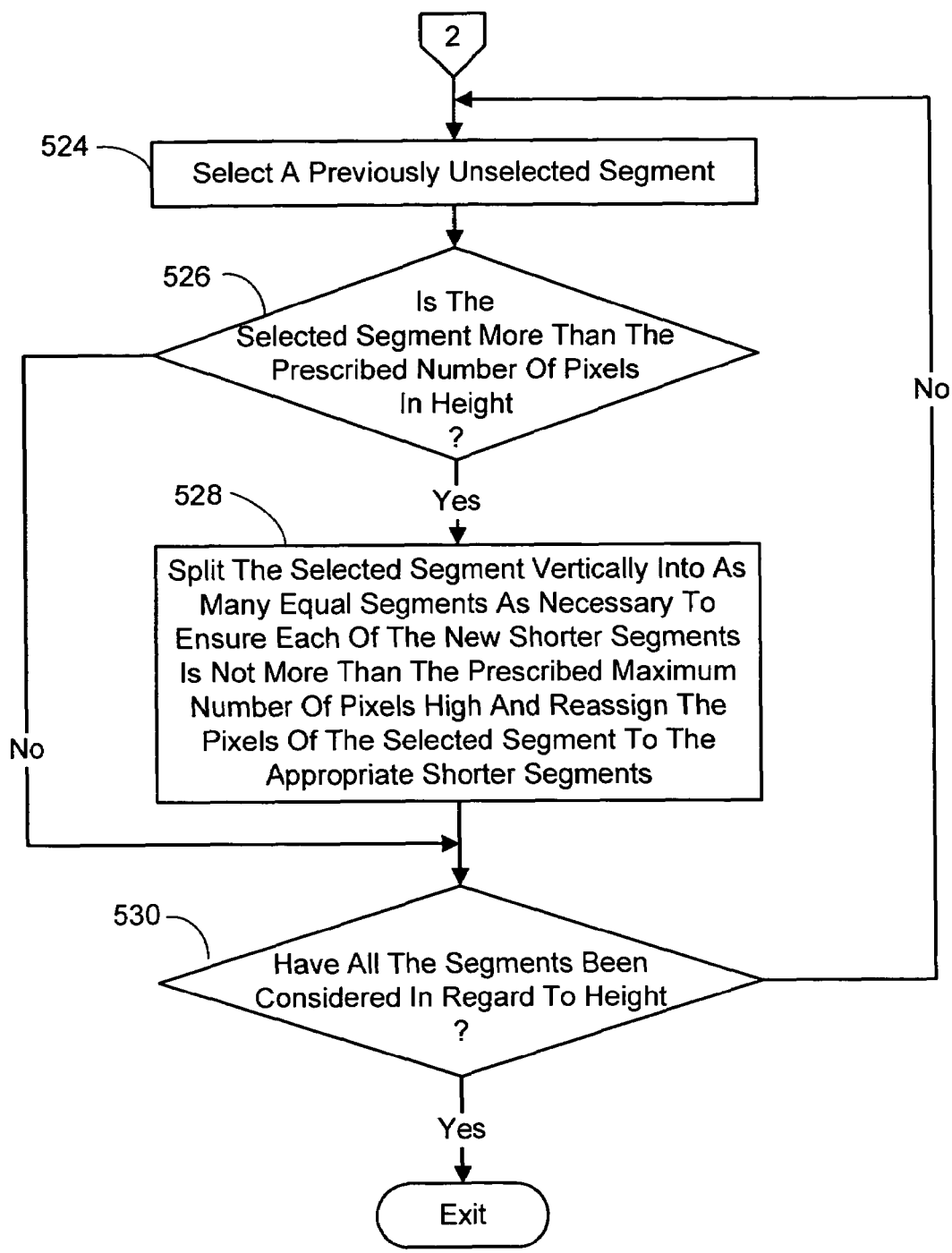

After smoothing, the segmenting phase begins. This is accomplished in one embodiment of the invention as outlined in the flow diagram of FIGS. 5A-C for each of the multiple images involved. First, each pixel of the image under consideration is assigned its own segment (process action 500). Each pixel is then selected in turn in a prescribed order (process action 502). For example, in tested embodiments, a raster order was used. The neighboring 4-connected segments (pixels) are merged with (i.e., reassigned to) the segment assigned to the selected pixel (if it is not already in that segment), if the average color of the segment and that of the selected pixel differs by less than some prescribed threshold (process action 504). For corner and edge pixels, only those "4-connected" pixels that exist are considered. It is next determined if there are any remaining unselected pixels (process action 506). If so, process actions 502 and 506 are repeated, until all the pixels have been considered. Once all the pixels have been considered, a previously unselected segment is selected (process action 508) and in process action 510 it is determined if the selected segment is less than a prescribed number of pixels in area (e.g., 100 pixels as in tested embodiments). If the selected segment is not less than the prescribed number of pixels in area, then no action is taken. However, if it is found to be less that the prescribed number, it is merged with whatever neighboring segment that has the most similar average color (process action 512). In other words, the pixels of the selected segment are reassigned to the neighboring segment whose average color is closest to the average color of the selected segment. It is next determined if there are any remaining unselected segments (process action 514). If so, process actions 508 through 514 are repeated until all the segments have been selected and processed.

It is noted that large areas of homogeneous color may also possess varying disparity. To account for this possibility, the segments are limited to a prescribed size in both width and height. More particularly, referring to FIGS. 5B-C, the process continues by once again selecting one of the segments (process action 516). It is then determined if the selected segment is more than a prescribed number of pixels wide (process action 518). For example, in tested embodiments the prescribed number of pixels was 40. If the selected segment is not more than the prescribed number of pixels wide, then no action is taken. However, if the selected segment exceeded the prescribed number of pixels in width, it is split horizontally into as many equal segments as necessary to ensure each of the new thinner segments is not more than the prescribed maximum number of pixels in width (process action 520). This is accomplished by reassigning the pixels of the selected segment to the appropriate new thinner segment. Next, it is determined if all the segments have been considered in regard to width (process action 522). If not, process actions 516 through 522 are repeated. If, however, all the segments have been considered, then the splitting procedure is repeated except in regard to segment height. More particularly, a segment is selected (process action 524), which may be one of the newly created segments produced by the segment width splitting procedure. Then, in process action 526, it is determined if the selected segment is more than a prescribed number of pixels tall. If the selected segment is not more than the prescribed number of pixels tall, then no splitting is performed. However, if the selected segment exceeds the prescribed number of pixels in height, the selected segment is split vertically into as many equal segments as necessary to ensure each of the new shorter segments is not more than the prescribed maximum number of pixels in height (process action 528). Again, this is accomplished by reassigning the pixels of the selected segment to the appropriate new shorter segment. It is then determined if all the segments have been considered in regard to their height (process action 530). If not, process actions 524 through 530 are repeated. If all the segments have been considered the process ends.

In tested embodiments of the present invention, the result of the foregoing merging and splitting operations is that all the final segments will vary in size from 100 to 1600 pixels. An example of the foregoing segmentation procedure is shown in FIGS. 6(a) and (b), where FIG. 6(a) is the original image and FIG. 6(b) represents its segmentation.

2.2 Initial Disparity Space Distribution

After segmentation, the next step is to compute the initial disparity space distribution (DSD) for each segment in each image. The DSD is the set of probabilities over multiple disparities for segment $s_{ij}$ in image $I_i$. It is a variant of the classic disparity space image (DSI), which associates a cost or likelihood at every disparity with every pixel [1]. The probability that segment $s_{ij}$ has disparity d is denoted by $p_{ij}(d)$, with $$\sum_d p_{ij}(d) = 1.$$

The initial DSD for each segment $s_{ij}$ is set to:

$$p_{ij}^0(d) = \frac{\prod_{k \in N_i} m_{ijk}(d)}{\sum_{d'} \prod_{k \in N_i} m_{ijk}(d')}, \quad (1)$$

where $m_{ijk}(d)$ is the matching function for $s_{ij}$ in image k at disparity d, and $N_i$ are the neighbors of image i. It will be assumed for this description that $N_i$ consists of the immediate neighbors of i, i.e., the images capture by cameras directly adjacent to i. In the case of an end camera in a row of cameras, there would only be one neighboring image available. In addition, division by the sum of all the matching scores over the complete range of d' ensures the DSD sums to one. The matching scores over the complete range of d' can be obtained by computing the matching function for the projection of a segment, at the depth associated with the disparity, in a neighboring image and then recomputing the matching function.

Given the gain differences between the cameras, it was found that a matching score which uses a histogram of pixel gains produces good results, although other pixel characteristics and other conventional non-histogram-based matching methods could be employed instead. For each pixel x in segment $s_{ij}$, its projection x' in neighboring image k is found using any appropriate projection method. A pixel gain ratio histogram is then created using the gains (ratios), $I_i(x)/I_k(x')$. For color pixels, the gains for each channel are computed separately and added to the same histogram. The bins of the histogram are computed using a log scale to ensure a better spacing of the data. In tested embodiments of the segmentation procedure, a histogram with 20 bins ranging from 0.8 to 1.25 was used with good results.

Figure 7:
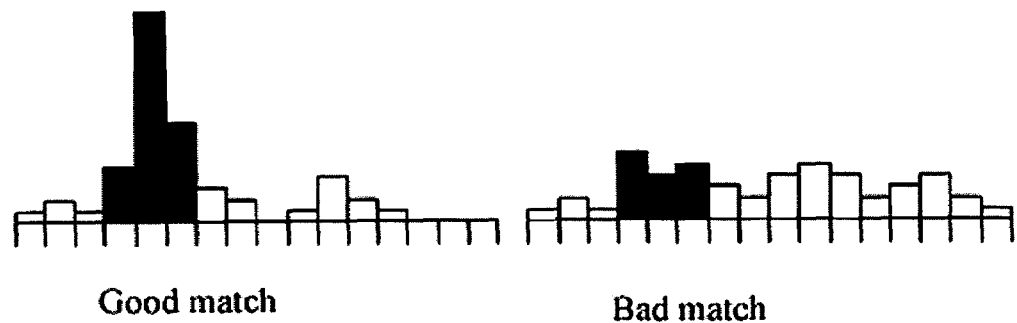
FIG. 7 is a diagram showing examples of gain ratio histograms representing a good match and a bad match in connection with the Disparity Space Distribution (DSD) computations.

Generally, if a match is good using the foregoing histogram method, the histogram has a few bins with large values with the rest being small, while a bad match has a more even distribution, as illustrated in FIG. 7. To measure the foregoing "sharpness" of the distribution, several methods could be used, such as measuring the variance or entropy. However, in tested embodiments of the present invention the following matching function was found to be both efficient and to produce good results:

$$m_{ijk}(d) = \max_l (h_{l-1} + h_l + h_{l+1}) \quad (2)$$

where $h_l$ is the l th bin in the histogram, i.e., the matching score is the sum of the three largest contiguous bins in the histogram.

Once the matching score is determined for the initial disparity of the segment under consideration with a neighboring image, it is recomputed for the entire set of disparity values. For example, in tested embodiments the matching score was recomputed by projecting the segment into the neighboring image using the depth associated with each disparity. The depth associated with each disparity is computed by finding the change in depth that corresponds to a one pixel shift in the projection of the center pixel in the middle camera with one of its neighbors. Thus, for each disparity, a set of different neighboring pixels will be involved in the foregoing gain ratio(s) computations and so the histogram will likely have a different profile resulting in a different match score. A greater match score indicates that the segment under consideration may more closely match the region of the neighboring image associated with the shift, and that the incremented disparity value may be more accurate than the other candidate values.

Figure 8A:
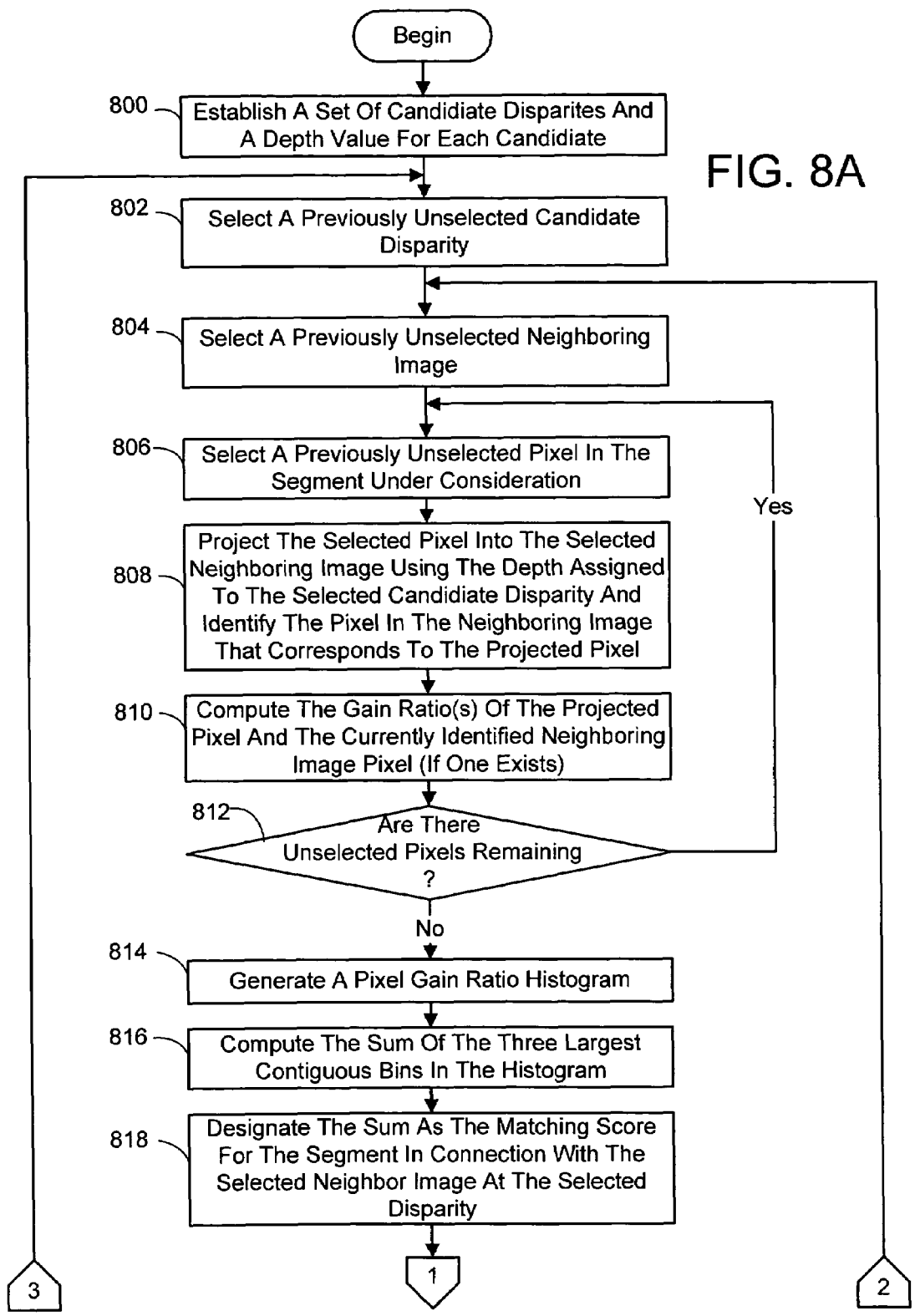
FIGS. 8A-B are a flow chart diagramming a process for computing the initial DSD estimate for each segment of each image that implements that part of the 3D reconstruction process of FIG. 2.
Figure 8B:
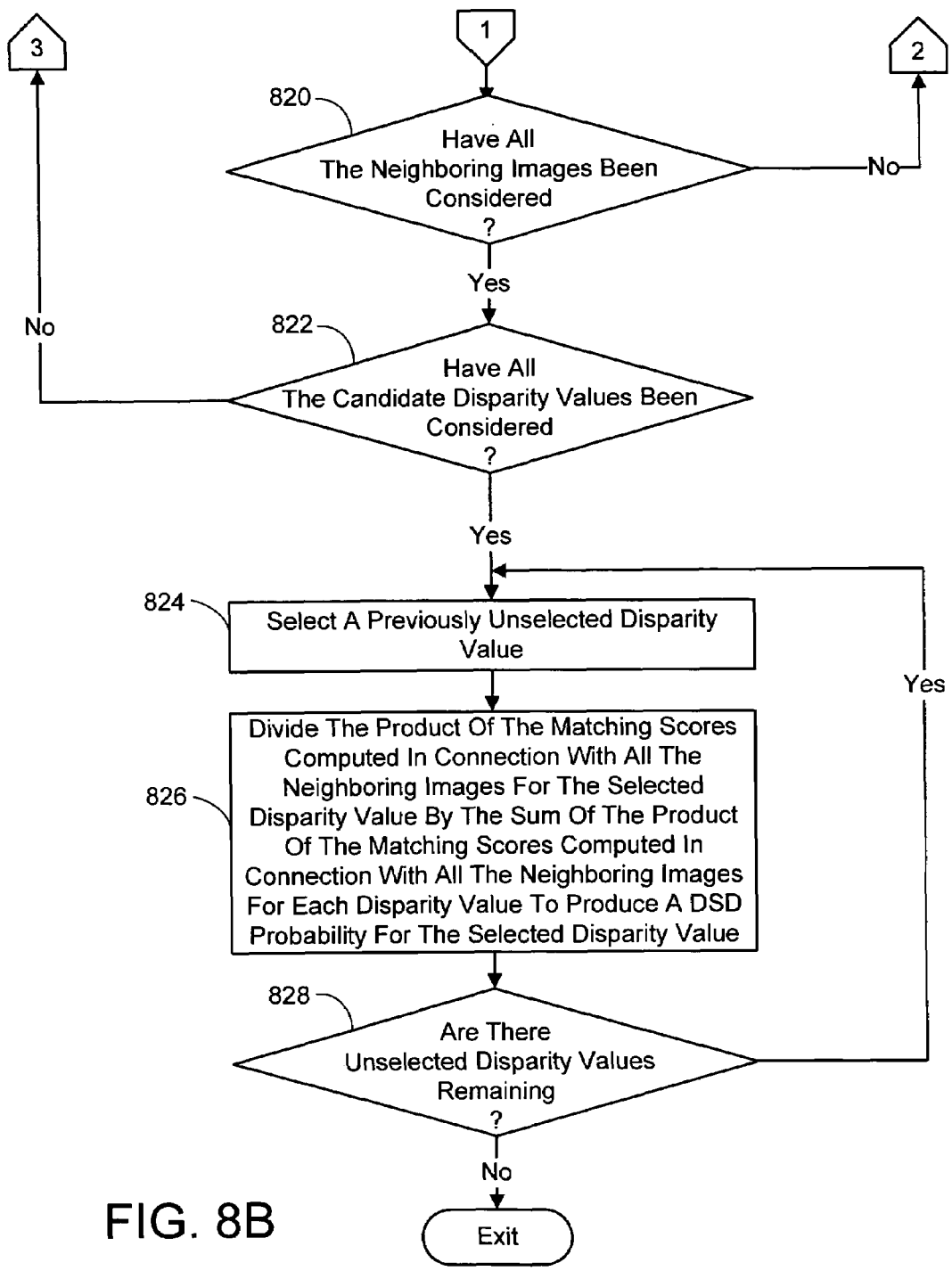

The foregoing initial DSD procedure as performed on each segment in each image of the group of images being processed will now be outlined in reference to the flow diagram shown in FIGS. 8A-B. First, a set of depth values, each corresponding to a unique disparity, are computed (process action 800). In one embodiment of the DSD procedure, the set of candidate disparities and a depth value for each candidate are established as follows. First, user-specified minimum and maximum depth values are input. The center pixel in a middle image in regard to viewpoint of said multiple images is then projected onto one of its neighboring images using the minimum depth specified by the user. The minimum depth value is assigned to a disparity value associated with the neighboring image pixel that corresponds to the projected center pixel. Next, the center pixel is projected again so that it lies one disparity value from the immediately preceding projection and the depth associated with the current center pixel projection is ascertained. It is then determined if the last-ascertained depth value exceeds the user-specified maximum depth. If not, the last-ascertained depth is assigned to a disparity equaling the immediately preceding disparity value assigned, but incremented by one disparity level. This projecting of the center pixel, determining if the ascertained depth exceeds the maximum value and establishing of a new disparity and associated depth continues until it is determined that the last-ascertained depth value exceeds the user-specified maximum depth. At that point, the range of disparity values that have been assigned depths are designated as the candidate disparity values. Next, a disparity value is selected from the set of candidate disparity values (process action 802). A neighboring image of the image whose segment is being considered is then selected (process action 804). This is followed by selecting a previously unselected pixel in the segment under consideration (process action 806) and in process action 808 projecting it into the selected neighboring image, using the depth associated with the selected disparity, to identify the pixel in the neighboring image that corresponds to the projected pixel. As each image overlaps at least one neighboring image, at least some of the pixels in the image under consideration will correspond to pixels in a neighboring image. If the selected pixel does have corresponding pixels in selected neighboring image, then the ratio or ratios of the gains associated with the projected pixel and the currently identified neighboring image pixel is computed (process action 810). An example of a situation where there can be multiple ratios associated with this computation is where the images are color images. In such a case, a ratio of the gains of each applicable color channel can be computed. It is next determined if there are any remaining unselected pixels in the segment under consideration (process action 812). If so, process actions 806 through 812 are repeated until all the pixels have been considered. When there are no unselected pixels remaining, in process action 814, a pixel gain ratio histogram (as described previously) is generated. The sum of the three largest contiguous bins in the histogram is then computed (process action 816) and this sum is designated as the matching score for the segment with the selected neighbor image at the selected disparity (process action 818).

At this point in the process, the matching scores between the pixels of the segment under consideration and pixels of the selected neighboring image have been computed for the selected disparity. If there is another neighboring image, the foregoing procedure is repeated for it. Accordingly, referring to FIG. 8B, in process action 820 it is determined if all the neighboring images have been selected. If not, process actions 804 through 820 are repeated. If all the neighboring images have been considered, process action 822 checks if there are unselected disparity values remaining. If so, a new disparity is selected and process actions 802 through 822 are repeated. After the entire set of disparities has been selected, the initial DSD for the segment is computed. This entails selecting a previously unselected one of the disparities associated with the matching score calculations (process action 824). The product of the matching scores computed in connection with all the neighboring images for the selected disparity is then divided by the sum of the product of the matching scores computed in connection with all the neighboring images for each disparity, to produce a DSD probability for the selected disparity (process action 826). This is followed by ascertaining if there are any remaining previously unselected disparities (process action 828). If so, process actions 824 and 828 are repeated until all the disparities have been considered. When a DSD probability has been computed for each disparity, the process ends for the segment under consideration.

2.3 DSD Refinement

The next step is to iteratively refine the disparity space distribution of each segment in each image of the group of images being processed. It is assumed as in the previous section that each segment has a single disparity.

When refining the DSD, it is desired to enforce a smoothness constraint between segments and a consistency constraint between images. The smoothness constraint states that neighboring segments with similar colors should have similar disparities. The second constraint enforces consistency in disparities between images. That is, if a segment with disparity d is projected onto a neighboring image, the segment it projects to should have disparities close to d.

These two constraints are iteratively enforced using the following equation:

$$p_{ij}^{t+1}(d) = \frac{l_{ij}(d) \prod_{k \in N_i} c_{ijk}(d)}{\sum_{d'} l_{ij}(d') \prod_{k \in N_i} c_{ijk}(d')} \quad (3)$$

where $l_{ij}(d)$ enforces the smoothness constraint and $c_{ijk}(d)$ enforces the consistency constraint with each neighboring image in $N_i$. In tested embodiments, it was found that iterating through the images about 50-60 times produced the desired refinement of the disparity probabilities. The details of the smoothness and consistency constraints are as follows.

2.3.1 Smoothness Constraint

When creating initial segments, the heuristic that neighboring pixels with similar colors should have similar disparities is used. The same heuristic is used across segments to refine the DSD. Let $S_{ij}$ denote the neighbors of segment $s_{ij}$, and $\hat{d}_{il}$ be the maximum disparity estimate for segment $s_{il} \in S_{ij}$. It is assumed that the disparity of segment $s_{ij}$ lies within a vicinity of $\hat{d}_{il}$ modeled by a contaminated normal distribution with mean $\hat{d}_{il}$:

$$l_{ij}(d) = \prod_{s_{ij} \in S_{ij}} \mathcal{N}(d; \hat{d}_{il}, \sigma_l^2) + \varepsilon \quad (4)$$

where $\mathcal{N}(d; \mu, \sigma^2) = (2\pi\sigma^2)^{-1} e^{-(d-\mu)^2/2\sigma^2}$ in tested embodiments of the invention is the normal distribution and the offset $\varepsilon = 0.01$. The variance $\sigma_l^2$ for each neighboring segment $s_{il}$ is estimated using three values: the similarity in color of the segments, the length of the border between the segments and $p_{il}(\hat{d}_{il})$. Let $\Delta_{jl}$ be the difference between the average colors of the pixels within segments $s_{ij}$ and $s_{il}$, and $b_{il}$ be the percentage of $s_{ij}$'s border that $s_{il}$ occupies. In addition, $\sigma_l^2$ is set to:

$$\sigma_l^2 = \frac{v}{p_{il}(\hat{d}_{il})^2 b_{jl} \mathcal{N}(\Delta_{jl}; 0, \sigma_\Delta^2)} \quad (5)$$

where the width scalar $v = 8$ and the squared variance of the color difference Guassian $\sigma_\Delta^2 = 30$ in tested embodiments of the present invention.

2.3.2 Consistency Constraint

The consistency constraint ensures that the disparity maps between the different images agree, i.e., if a pixel with disparity d is projected from one image into another, its projection should also have disparity d. When computing the value of $c_{ijk}(d)$ to enforce consistency, several constraints are applied. First, a segment's DSD should be similar to the DSD of the segments it projects to in the other images. Second, while it is desired that the segments' DSD agree between images, they must also be consistent with the matching function $m_{ijk}(d)$. Third, some segments may have no corresponding segments in the other image due to occlusions.

For each disparity d and segment $s_{ij}$ its projected DSD is computed, $p_{ijk}(d)$ with respect to image $I_k$. If $\pi(k, x)$ is the segment in image $I_k$ that pixel x projects to and $C_{ij}$ is the number of pixels in $s_{ij}$, $$p'_{ijk}(d) = \frac{1}{C_{ij}} \sum_{x \in s_{ij}} p'_{\pi(k,x)}(d) \qquad (6)$$

The likelihood that segment $s_{ij}$ is occluded in image k also needs to be estimated. Since the projected DSD $p_{ijk}{}^t(d)$ is low if there is little evidence for a match, the visibility likelihood can be estimated as, $$v_{ijk} = \min\left(1.0, \sum_{d'} p'_{ijk}(d')\right). \qquad (7)$$

Along with the projected DSD, an occlusion function $o_{ijk}(d)$ is computed, which has a value of 0 if segment $s_{ij}$ occludes another segment in image $I_k$ and 1 if is does not. This ensures that even if $s_{ij}$ is not visible in image $I_k$, its estimated depth does not lie in front of a surface element in the kth image's estimates of depth. More specifically, $o_{ijk}(d)$ is defined as $$o_{ijk}(d) = 1.0 - \frac{1}{C_{ij}} \sum_{x \in s_{ij}} p'_{\pi(k,x)}(\hat{d}_{kl}) h(d - \hat{d}_{kl} + \lambda) \qquad (8)$$

where $h(x)=1$ if $x \geq 0$ and zero otherwise is the Heaviside step function and $\lambda$ is a constant used to determine if two surfaces are the same. In tested embodiments, $\lambda$ was set to 4 disparity levels. Finally, the occluded and non-occluded cases are combined. If the segment is not occluded, $c_{ijk}(d)$ is computed directly from the projected DSD and the match function, $p_{ijk}{}^t(d)m_{ijk}(d)$. For occluded regions, only the occlusion function $o_{ijk}(d)$ is used. The final function for $c_{ijk}(d)$ is therefore, $$c_{ijk}(d) = v_{ijk} p'_{ijk}(d) m_{ijk}(d) + (1.0 - v_{ijk}) o_{ijk}(d) \qquad (9)$$

Figure 9:
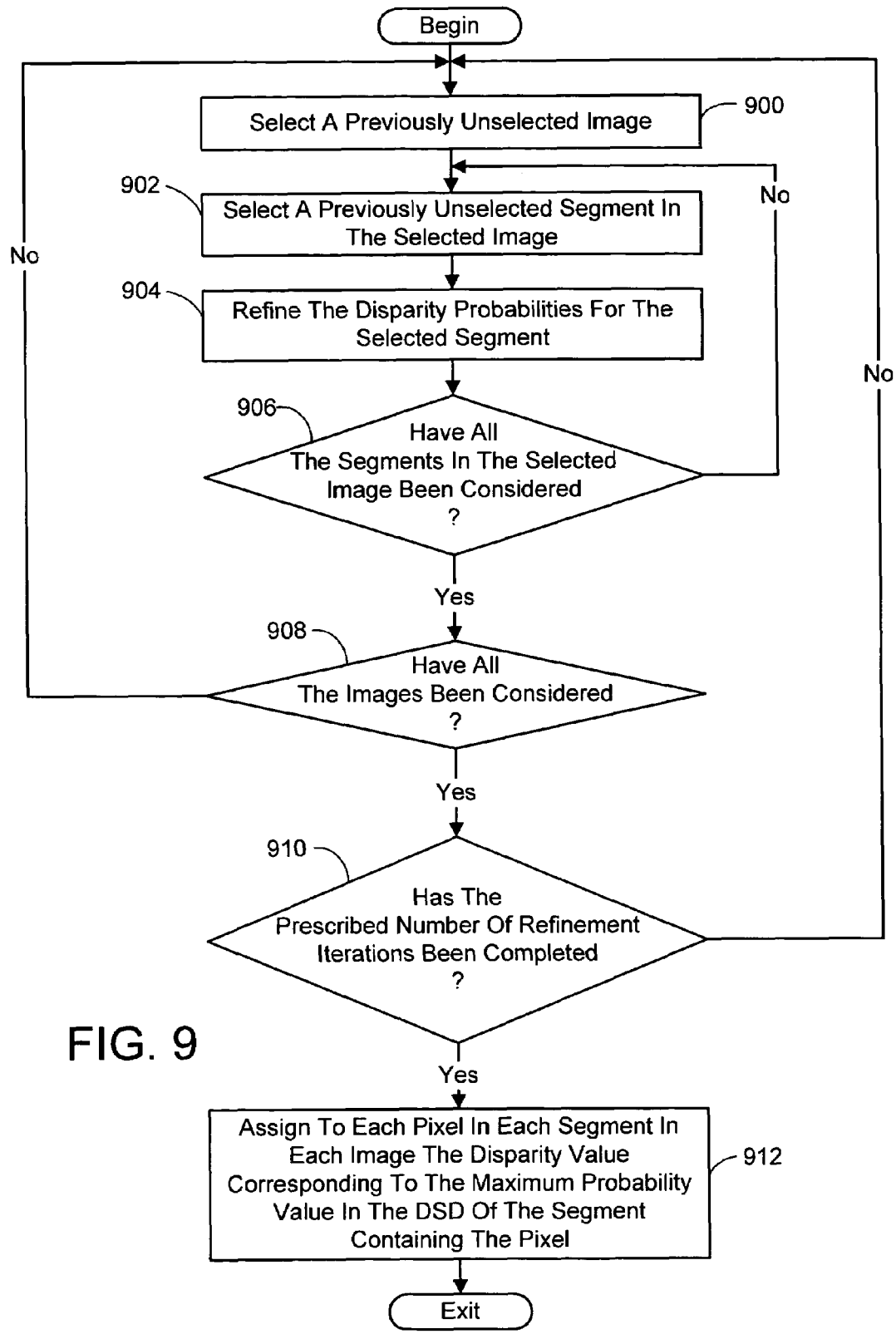
FIG. 9 is a flow chart diagramming a process for refining the initial DSD estimates that implements that part of the 3D reconstruction process of FIG. 2.

In one embodiment of the present invention, the foregoing DSD refinement process is performed as outlined in the flow diagram shown in FIG. 9. First, one of the images in the group of images being processed is selected (process action 900) and one of the segments of the selected image is selected (process action 902). Next, refined disparity probabilities are computed for the selected segment in the manner described previously (process action 904). It is then determined if all the segments of the selected image have been considered (process action 906). If not, process actions 902 through 906 are repeated for each remaining segment. Once all the segments of the selected image have been considered, it is determined if all the images have been processed (process action 908). If not, process actions 900 through 908 are repeated for all the remaining images. Once all the images have been considered, it is determined if a prescribed number of refinement iterations have been completed (process action 910). If not, then the entire process of actions 900 through 910 is repeated until the prescribed number of iterations have been performed.

Once all the prescribed iterations have been completed, each pixel x in each segment $s_{ij}$ in each image is assigned the disparity value $\hat{d}_{ij}$ corresponding to the maximum probability value in the DSD of the segment containing the pixel as its disparity $d(x)$ (process action 912). In equation form, this is:

$$\forall x \in s_{ij}, d(x) = \arg \max_d p_{ij}(d'). \qquad (10)$$

2.4 Disparity Smoothing

Up to this point, the disparities in each segment are constant. At this stage, this constraint is relaxed and the disparities are allowed to vary smoothly based on disparities in neighboring segments and images.

As indicated previously, at the end of the refinement stage, each pixel in each segment of each image was set to the disparity with the maximum probability value in the associated DSD. To ensure that disparities are consistent between images, the following is done. For each pixel x in image $I_i$ with disparity $d_i(x)$, it is projected into each neighboring image $I_k$ to find the pixel y in $I_k$ that corresponds to the projection of x. $d_i(x)$ is then updated as follows:

$$d_i^{t+1}(x) = \frac{1}{\#N_i} \sum_{k \in N_i} \delta_{ik}^x \frac{d_i^t(x) + d_k^t(y)}{2} + (1 - \delta_{ik}^x) d_i^t(x), \qquad (11)$$

where $\delta_{ik}{}^x$ is a binary function such that it is equal to 1 when $|d_i(x) - d_k(y)| < \lambda$ and equal to 0 when $|d_i(x) - d_k(y)| \geq \lambda$, and so acts as an indicator variable that tests for similar disparities, and where $\#N_i$ is the number of neighbors. In tested embodiments, $\lambda$ was set to 4 disparity levels.

After averaging the disparities across the images, the disparities within a prescribed window of each pixel in each of the images, restricted to within the segment containing the pixel, are averaged to ensure they remain smooth. In tested embodiments, a 5×5 window was employed with success, although other sizes can be used as desired. It is noted that if the prescribed window extends past the borders of a segment, only those pixels inside the segment are averaged to establish a final disparity value for the pixel under consideration. The foregoing disparity smoothing between images is accomplished iteratively. In tested embodiments, it was found that iterating through the images about 10-20 times using Eq. (11) and averaging within segments to smooth the disparity values in each image in turn produced the desired effect.

Figure 10B:
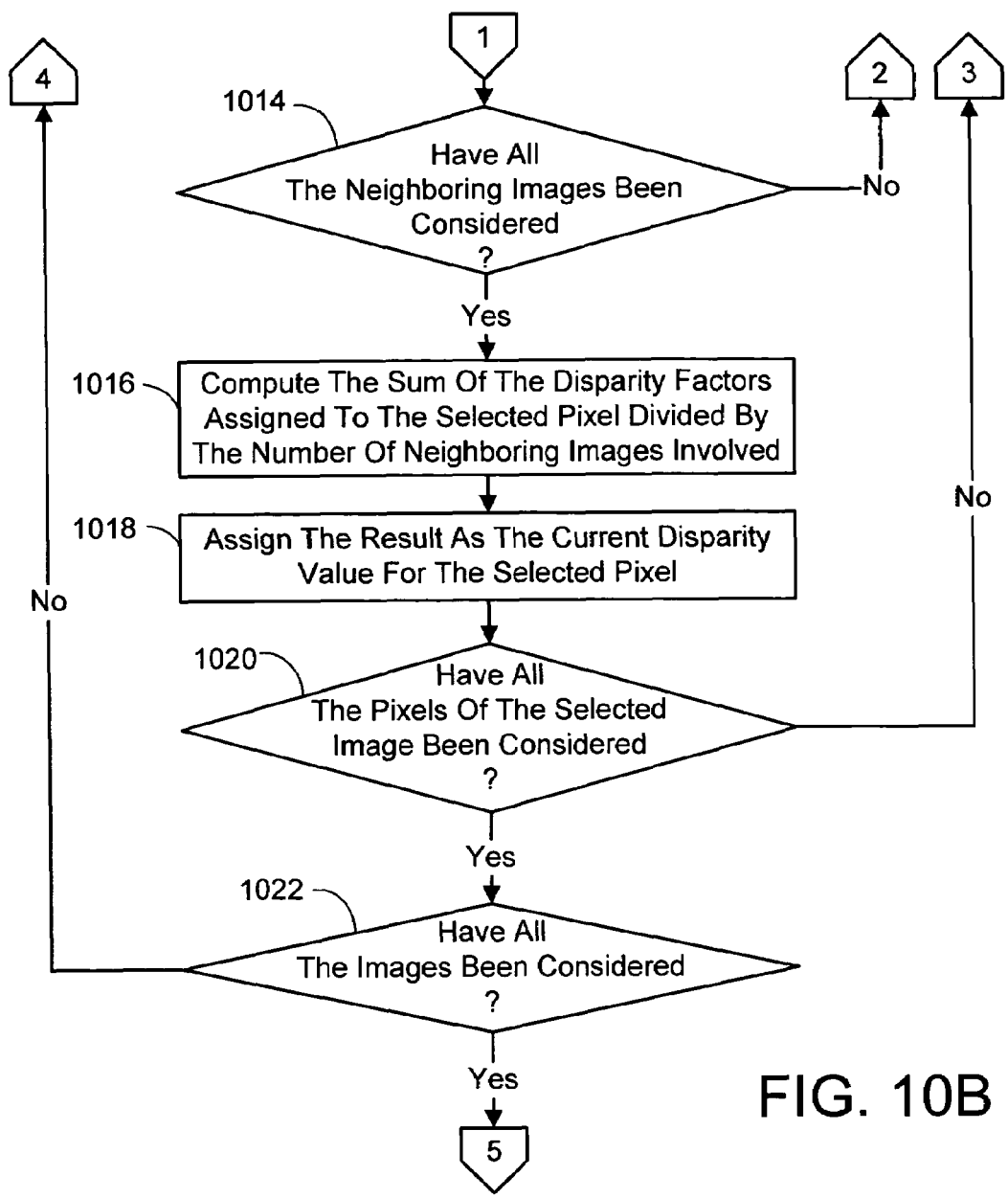
Figure 10C:
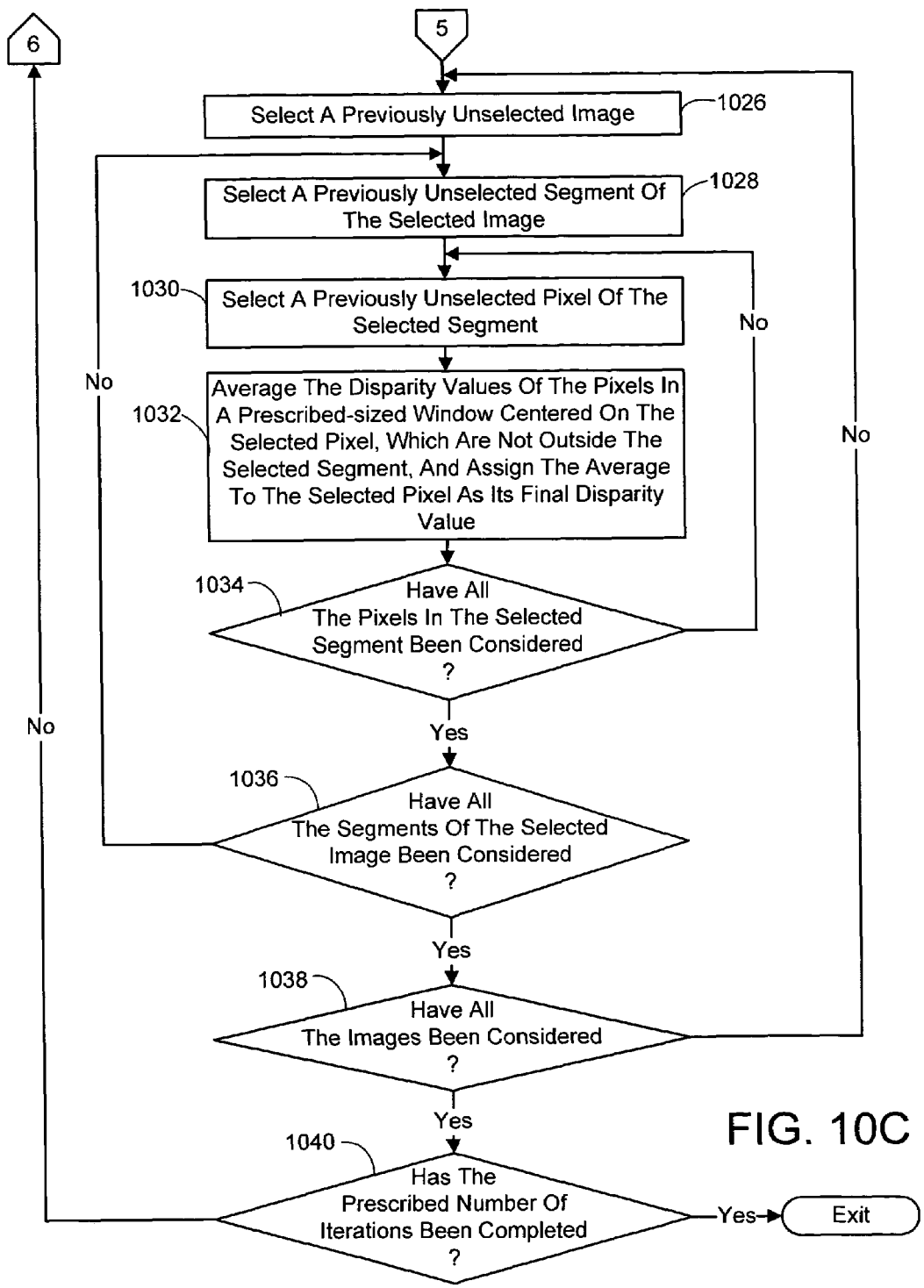

In one embodiment of the present invention, the foregoing smoothing procedure is performed as outlined in the flow diagram shown in FIGS. 10A-C. First, one of the images in the group of images being processed is selected (process action 1000), and then one of the pixels in that image is selected (process action 1002). In addition, one of the neighboring images of the selected image is selected (process action 1004). This is followed by projecting the selected pixel into the selected neighboring image and identifying the pixel in the neighboring image that corresponds to the projected pixel (process action 1006). It is then determined if the absolute value of the difference between the disparity value currently assigned to the selected pixel and that assigned to the identified corresponding pixel of the neighboring image is less than a prescribed number of disparity levels (process action 1008). If it is less, then the average of the disparity values of the two pixels under consideration is computed and assigned to the selected pixel as the disparity factor associated with the selected neighboring image (process action 1010). If, however, the absolute value of the difference is not less than the prescribed number of disparity levels, then the disparity value currently assigned to the selected pixel is assigned to it as the disparity factor associated with the selected neighboring image (process action 1012). It is next determined if all the neighboring images of the selected image have been considered (process action 1014). If not, then process actions 1004 through 1014 are repeated for each remaining neighboring image. Once all the neighboring images have been considered, in process action 1016, the sum of the disparity factors assigned to the selected pixel as being associated with the neighboring images is computed and divided by the number of neighboring images involved. Then, the result is assigned as the current disparity value for the selected pixel (process action 1018). It is next determined if all the pixels of the selected image have been processed (process action 1020). If not, process actions 1002 through 1020 are repeated for each of the remaining pixels. If all the pixels in the selected image have been processed, then it is next determined if all the images have been considered (process action 1022). If not, then process actions 1000 through 1022 are repeated for each of the remaining images. Once the inter-image smoothing is complete, the process continues with intra-image smoothing as described above. More particularly, referring now to FIG. 10C, one of the images is selected again (process action 1026). This time, a segment in the selected image is selected (process action 1028) and a pixel of the selected segment is selected (process action 1030). The disparity values of the pixels in a prescribed-sized window centered on the selected pixel, which are not outside the selected segment, are then averaged and the result is assigned to the selected pixel as its final disparity value (process action 1032). It is next determined if all the pixels in the selected segment have been considered (process action 1034). If not, then process actions 1030 through 1034 are repeated for each remaining pixel. When all the pixels in the selected segment have been processed, it is determined if all the segments in the selected image have been considered (process action 1036). If not, then process actions 1028 through 1036 are repeated for each remaining segment. When all the segments in the selected image have been processed, the intra-image smoothing is performed on the rest of the images. To this end, it is determined if all the images have been considered for intra-image smoothing (process action 1038). If not, then process actions 1026 through 1038 are repeated for each remaining image. When all the images have been considered, in process action 1040, it is determined if a prescribed number of smoothing iterations have been completed. If not, then the entire process of actions 1000 through 1040 is repeated until the prescribed number of iterations has been performed. At that point, the smoothing process ends.

2.5 Exemplary Results

Figures 11A, 11B, 11C:
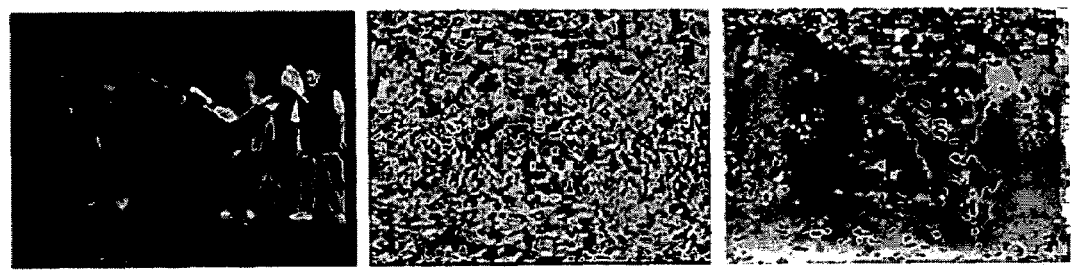
FIGS. 11(a)-(e) show sample results obtained using one embodiment of the 3D reconstruction process of FIG. 2, where
Figures 11D, 11E:

FIGS. 11(*a*)-(*e*) show some sample results obtained using a tested embodiment of the present 3D reconstruction process. FIG. 11(*a*) is an image of a group of people watching a break dancer. Neighboring images exist but are not shown. FIG. 11(*b*) illustrates the results of the segmentation phase of the reconstruction where each splotch represents a different segment. FIG. 11(*c*) exemplifies per pixel depths derived from the disparity estimates that would be obtained by assigning the disparity associated with the maximum probability value of the initial DSD of a segment to the pixels in that segment. It is noted that in FIGS. 11(*c*)-(*e*), the lighter the pixel is in the image, the closer it is estimated to be to the camera that captured the original image. FIG. 11(*d*) represents the per pixel depth obtained as in FIG. 11(*c*) but after the DSD probabilities are refined in accordance with the present reconstruction process. Finally, FIG. 11(*e*) represents the per pixel depths obtained after the previously described smoothing procedure is performed. It can be seen that the disparity estimates improve at each successive stage.

3.0 References

[1] Scharstein, D., and Szeliski, R. 2002. A taxonomy and evaluation of dense two-frame stereo correspondence algorithms. *International Journal of Computer Vision* 47, 1 (May), 7-42.

[2] Tao, H., Sawhney, H., and Kumar, R. 2001. A global matching framework for stereo computation. In *Eighth International Con-ference on Computer Vision (ICCV* 2001), vol. I, 532-539.

[3] Zhang, Y., and Kambhamettu, C. 2001. On 3D scene flow and structure estimation. In *Conference on Computer Vision and Pattern Recognition (CVPR'*2001), vol. II, 778-785.

Wherefore, what is claimed is:

1. A computer-implemented process for computing a 3D reconstruction of a scene from multiple images thereof which were captured from different viewpoints, comprising using a computer to perform the following process actions:

segmenting each image into segments representing regions of the image whose pixels are likely to exhibit similar disparities;

computing an initial disparity space distribution (DSD) for each segment of each image using an assumption that all pixels within a segment have the same disparity, wherein the initial DSD for a segment comprises an initial estimate of probability that the pixels of the segment exhibit a particular disparity for each of a set of candidate disparities;

refining the initial estimates of the disparity probabilities of the initial DSD for each segment of each image by simultaneously enforcing a smoothness constraint between neighboring segments within the same image and a consistency constraint between corresponding segments in the other images that depict the same portion of the scene to produce a refined DSD;

for each segment in each image, assigning the disparity corresponding to the maximum probability value in the refined DSD of the segment to each pixel of the segment; and for each image, smoothing the disparity values assigned to each pixel based on the disparities of corresponding pixels in the other images that depict the same portion of the scene and then based on the disparity values of neighboring pixels within the same segment of the image.

2. The process of claim 1, wherein the process action of segmenting each image, comprises the actions of:
- assigning each pixel of the image under consideration to its own segment;
- for each pixel in turn in a prescribed order, reassigning a prescribed number of the pixels neighboring the pixel under consideration to the segment assigned to that pixel, whenever their average color of the segment and the color of the pixel under consideration differ by less than a prescribed threshold.
- for each segment in turn, determining if the segment is less than a prescribed number of pixels in area, and whenever the segment is less than the prescribed number of pixels in area, reassigning the pixels of the segment to the neighboring segment that has the closest average color to that of the segment under consideration;
- for each segment in turn, determining if the segment is more than a prescribed number of pixels wide, and whenever the segment exceeds the prescribed number of pixels in width, splitting the segment horizontally into as many equal segments as necessary to ensure each of the new thinner segments is not more than said prescribed number of pixels in width by reassigning the pixels of the selected segment to the appropriate new thinner segment;
- for each segment in turn, determining if the segment is more than a prescribed number of pixels tall, and whenever the segment exceeds the prescribed number of pixels in height, splitting the segment vertically into as many equal segments as necessary to ensure each of the new shorter segments is not more than said prescribed number of pixels in height by reassigning the pixels of the selected segment to the appropriate new shorter segment.

3. The process of claim 2, wherein the process action of segmenting each image further comprises, prior to performing the action of assigning each pixel of the image under consideration to its own segment, the action of smoothing the color differences between adjacent pixels of the image under consideration.

4. The process of claim 3 wherein the process action of smoothing the color differences between adjacent pixels of the image under consideration, comprises the actions of:
- for each pixel in raster order,
  - selecting each possible grouping of a prescribed number of contiguous pixels neighboring the pixel under consideration in turn,
    - for each selected group, subtracting the intensity of each color channel of each pixel in the selected group from the intensity of corresponding color channel of the pixel under consideration, and summing the squared value of the resulting differences to produce a total difference for the selected group;
  - identifying the group exhibiting the smallest total difference.
- averaging the color of each of the pixels in the identified group and that of the selected pixel, and
- assigning the resulting average color as the current color of the selected pixel.

5. The process of claim 4, wherein the color smoothing procedure is repeated a prescribed number of times.

6. The process of claim 4, wherein the prescribed number of contiguous neighboring pixels is three.

7. The process of claim 2, wherein in the prescribed order is a raster order.

8. The process of claim 2, wherein the prescribed number of neighboring pixels comprises the 4-connected neighbors.

9. The process of claim 2, wherein the prescribed number of pixels in area is 100 pixels.

10. The process of claim 2, wherein the prescribed number of pixels in width is 40 pixels and the prescribed number of pixels in height is 40 pixels.

11. The process of claim 2, wherein the prescribed difference threshold between the average color of the segment and the color of the pixel under consideration is 8.

12. The process of claim 1, wherein the process actions of computing the initial DSD for each segment of each image, comprises the action of:
- (a) establishing the set of candidate disparities and a depth value for each candidate;
- (b) selecting a candidate disparity;
- (c) selecting a neighboring image of the image under consideration;
- (d) for each pixel in the segment under consideration,
  - projecting the pixel into the selected neighboring image using the depth associated with the selected candidate disparity to identify the pixel in the neighboring image that corresponds to the projected pixel,
  - if a corresponding pixel is identified, computing the ratio of one or more prescribed gains associated with the projected pixel and the identified neighboring image pixel;
- (e) generating a pixel gain ratio histogram;
- (f) computing the sum of the three largest contiguous bins in the pixel gain ratio histogram;
- (g) designating the computed sum as the matching score for the segment under consideration with the selected neighbor image at the selected candidate disparity;
- (h) repeating actions (c) through (g) for each remaining neighboring image of the image under consideration;
- (i) repeating actions (b) through (h) for each remaining candidate disparity; and
- (j) for each disparity value associated with a matching score, dividing the product of the matching scores computed in connection with all the neighboring images for the disparity under consideration by the sum of the product of the matching scores computed in connection with all the neighboring images for every disparity value associated with a matching score, to produce a DSD probability for that disparity value.

13. The process of claim 12, wherein multiple gain ratios are computed for each projected pixel and the identified neighboring image pixel compared comprising the gain ratio of each color channel associated with the pixels.

14. The process of claim 12, wherein a log scale is used to establish the ranges of the bins of the pixel gain ratio histogram.

15. The process of claim 14, wherein the pixel gain ratio histogram comprises 20 bins.

16. The process of claim 12, wherein the process action of establishing the set of candidate disparities and a depth value for each candidate, comprises the actions of:
- (a) inputting user-specified minimum and maximum depth values;
- (b) projecting the center pixel in a middle image in regard to viewpoint of said multiple images onto one of its neighboring images using the minimum depth specified by the user;
- (c) assigning the minimum depth value to a disparity value associated with the neighboring image pixel which corresponds to the projected center pixel;

(d) projecting of the center pixel so that it lies one disparity value from the immediately preceding projection and ascertaining the depth associated with the current pixel projection;

(e) determining if the last-ascertained depth value exceeds the user-specified maximum depth;

(f) whenever the last-ascertained depth value does not exceed the user-specified maximum depth, assigning the last-ascertained depth to a disparity equaling the immediately preceding disparity value assigned but incremented by one disparity level; and (e) repeating actions (d) through (f) until it is determined in action (e) that the last-ascertained depth value exceeds the user-specified maximum depth, at which point the range of disparity values that have been assigned depths are designated as the candidate disparity values.

17. The process of claim 1, wherein the process action of refining the initial estimates of the disparity probabilities of the initial DSD for each segment of each image, comprises the actions of:

(a) computing refined disparity probabilities for each segment of each image using the equation $$p_{ij}(d) = \frac{l_{ij}(d) \prod_{k \in N_i} c_{ijk}(d)}{\sum_{d'} l_{ij}(d') \prod_{k \in N_i} c_{ijk}(d')},$$

where $p_{ij}(d)$ refers to a refined disparity probability value associated with probability d for segment $s_{ij}$, $l_{ij}(d)$ is a function that enforces the smoothness constraint, $c_{ijk}(d)$ is a function that enforces the consistency constraint with each neighboring image in the group of neighboring images $N_i$, and d' refers to all the disparity values having associated probability values; and (b) repeating action (a) a prescribed number of times.

18. The process of claim 17, wherein the prescribed number of times ranges between 50 and 60.

19. The process of claim 1, wherein the process action of smoothing the disparity values assigned to each pixel of each image comprises inter-image smoothing, comprising for each pixel of each image in turn, the actions of:

for each neighboring image of the image under consideration, projecting the pixel under consideration into the neighboring image and identifying the pixel in the neighboring image that corresponds to the projected pixel, averaging the disparity values of the projected and corresponding pixels and assigning the average to the pixel under consideration as the disparity factor associated with the neighboring image involved, whenever the absolute value of the difference between the disparity value currently assigned to the pixel under consideration and that assigned to the corresponding pixel in the neighboring image is less than a prescribed number of disparity levels, assigning the disparity value of the pixel under consideration as the disparity factor associated with the neighboring image involved, whenever the absolute value of the difference between the disparity value currently assigned to the pixel under consideration and that assigned to the corresponding pixel in the neighboring image is not less than a prescribed number of disparity levels, and summing the disparity factors assigned to the pixel under consideration as being associated with the neighboring images and dividing the sum by the number of neighboring images involved, and assigning the result as the current disparity value for the pixel.

20. The process of claim 19, wherein the process action of smoothing the disparity values assigned to each pixel of each image, further comprises intra-image smoothing, comprising for each pixel of each segment of each image, the action of averaging the currently-assigned disparity values of the pixels in a prescribed-sized window centered on the pixel under consideration, which are not outside the segment under consideration, and assigning the average to the pixel under consideration as its final disparity value.

21. The process of claim 20, wherein the inter-image and intra-image smoothing is repeated a prescribed number of times.

22. The process of claim 21, wherein the prescribed-sized window is a 5×5 pixel window.

23. The process of claim 1, wherein each of the images depicts a part of the scene that overlaps the part of the scene captured in at least one other of the images within a range from approximately 60 to approximately 100 percent.

24. The process of claim 1, wherein the multiple images represent contemporaneously captured images of a dynamic scene.

25. The process of claim 24, wherein the contemporaneously captured images comprise video frames capture by multiple video cameras placed at different viewpoints.

26. The process of claim 1, wherein the multiple images represent images of a static scene captured with multiple cameras placed at different viewpoints, or a single camera which is moved from viewpoint to viewpoint to capture each image.

27. A system for computing a 3D reconstruction of a scene from multiple overlapping images thereof which were captured from different viewpoints, comprising:

a camera rig comprising multiple cameras disposed so as to view different portions of the scene, but wherein the field of view of each camera overlaps that of each adjacent camera;

a general purpose computing device; and a computer program comprising program modules executable by the computing device, wherein the computing device is directed by the program modules of the computer program to, partition each image into segments whose pixels are likely to exhibit similar disparity values, compute a disparity space distribution (DSD) for each segment of each image comprising probability estimates representing the likelihood that the pixels making up the segment exhibit a particular disparity for each of a set of candidate disparities, for each segment in each image, assign the disparity corresponding to the maximum probability value in the DSD of the segment to each pixel of the segment; and for each image, smooth the disparity values assigned to each pixel based on the disparities of corresponding pixels in neighboring images that depict the same portion of the scene as well as the disparity values of neighboring pixels within the same segment of the image.

28. The system of claim 27, wherein the program module for computing the disparity space distribution (DSD) for each segment of each image, comprises sub-modules for:
  computing an initial disparity space distribution (DSD) for each segment of each image; and
  refining the initial estimates of the disparity probabilities of the initial DSD for each segment of each image by simultaneously enforcing a smoothness constraint between neighboring segments within the same image and a consistency constraint between corresponding segments in the other images that depict the same portion of the scene to produce a refined DSD.

29. The system of claim 28, wherein the sub-module for refining the initial estimates of the disparity probabilities of the initial DSD for each segment of each image, comprises sub-modules for:
  computing refined disparity probabilities for each segment of each image using the equation $$p_{ij}(d) = \frac{l_{ij}(d)\prod_{k \in N_i} c_{ijk}(d)}{\sum_{d'} l_{ij}(d')\prod_{k \in N_i} c_{ijk}(d')},$$

wherein $p_{ij}(d)$ refers to a refined disparity probability value associated with probability d for segment $s_{ij}$, $l_{ij}(d)$ is a function that enforces the smoothness constraint, $c_{ijk}(d)$ is a function that enforces the consistency constraint with each neighboring image in the group of neighboring images $N_i$, and d' refers to all the disparity values having associated probability values; and
  repeating the refined disparity probabilities computation sub-module a prescribed number of times.

30. The system of claim 29, wherein the function that enforces the smoothness constraint comprises the equation $$l_{ij}(d) = \prod_{s_{il} \in S_{ij}} (2\pi\sigma_l^2)^{-1} e^{-(d-\hat{d}_{il})^2/2\sigma_l^2} + \varepsilon,$$

wherein $S_{ij}$ denotes the neighbors of segment $s_{ij}$, $\hat{d}_{il}$ is the current maximum disparity estimate for segment $s_{il} \in S_{ij}$, $\varepsilon$ is an offset, and $$\sigma_l^2 = \frac{v}{p_{il}(\hat{d}_{il})^2 b_{jl}(2\pi\sigma_\Delta^2)^{-1} e^{-(\Delta_{jl})^2/2\sigma_\Delta^2}}$$

wherein v is the width scalar, $p_{il}(\hat{d}_{il})$ is last-computed probability for $\hat{d}_{il}$, $b_{jl}$ is the percentage of $s_{ij}$'s border that $s_{il}$ occupies, $\Delta_{jl}$ is the difference between the average colors of the pixels within the segments $s_{ij}$ and $s_{il}$, and $\sigma_\Delta$ is the variance of the color difference Gaussian.

31. The system of claim 30, wherein $\varepsilon=0.01$, v=8 and $\sigma_\Delta^2=30$.

32. The system of claim 29, wherein the function that enforces the consistency constraint comprises the equation $$c_{ijk}(d) = v_{ijk} p_{ijk}^t(d) m_{ijk}(d) + (1.0 - v_{ijk}) o_{ijk}(d)$$

wherein $$p_{ijk}^t(d) = \frac{1}{C_{ij}} \sum_{x \in s_{ij}} p_{\pi(k,x)}^t(d)$$

wherein $p_{ijk}(d)$ is the projected DSD with respect to neighboring image $I_k$ for disparity d of segment $s_{ij}$, $S_{ij}$ denotes the neighbors of segment $s_{ij}$, $\pi(k, x)$ is the segment in image $I_k$ that pixel x projects to and so $p_{\pi(k,x)}{}'(d)$ is the probability for disparity d for segment $\pi(k, x)$, and $C_{ij}$ is the number of pixels in $s_{ij}$, and wherein $m_{ijk}(d)$ is the matching function for segment $s_{ij}$ in image k at disparity d, and wherein $$v_{ijk} = \min\left(1.0, \sum_{d'} p_{ijk}^t(d')\right),$$

wherein $v_{ijk}$ represents the likelihood that segment $s_{ij}$ is occluded in image k, and wherein $$o_{ijk}(d) = 1.0 - \frac{1}{C_{ij}} \sum_{x \in s_{ij}} p_{\pi(k,x)}^t(\hat{d}_{kl}) h(d - \hat{d}_{kl} + \lambda),$$

wherein $o_{ijk}(d)$ is an occlusion function which has a value of 0 if segment $s_{ij}$ occludes another segment in image $I_k$ and 1 if is does not to ensure that even if $s_{ij}$ is not visible in image $I_k$ its depth based on its estimated disparity does not lie in front of a surface element in the kth image's depth based on its estimates of disparity, $C_{ij}$ is the number of pixels in $s_{ij}$ and $h(d-\hat{d}_{kl}+\lambda)=1$ if $x \geq 0$ and zero otherwise, which is the Heaviside step function and $\lambda$ is a constant used to determine if two surfaces are the same.

33. The system of claim 32, wherein $\lambda$ is set to 4 disparity levels.

34. A computer-readable storage medium having computer-executable instructions stored thereon for computing a 3D reconstruction of a scene from multiple images thereof which were captured from different viewpoints, said computer-executable instructions operable to:
  partition each image into segments whose pixels are likely to exhibit similar disparity values;
  compute a disparity space distribution (DSD) for each segment of each image comprising probability estimates representing the likelihood that the pixels making up the segment exhibit a particular disparity for each of a set of candidate disparities;
  for each segment in each image, assign the disparity corresponding to the maximum probability value in the DSD of the segment to each pixel of the segment; and
  for each image, smooth the disparity values assigned to each pixel based on the disparities of corresponding pixels in neighboring images that depict the same portion of the scene as well as the disparity values of neighboring pixels within the same segment of the image.

* * * * *